(12) United States Patent
Murata et al.

(10) Patent No.: US 7,281,195 B2
(45) Date of Patent: Oct. 9, 2007

(54) RECEIVING APPARATUS AND RECEIVING METHOD IN CDMA COMMUNICATION SYSTEM

(75) Inventors: Shuuichi Murata, Kawasaki (JP); Natsuhiko Nakayauchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 730 days.

(21) Appl. No.: 10/789,027

(22) Filed: Feb. 25, 2004

(65) Prior Publication Data

US 2004/0168113 A1 Aug. 26, 2004

Related U.S. Application Data

(63) Continuation of application No. PCT/JP01/07562, filed on Aug. 31, 2001.

(51) Int. Cl.
*H03M 13/37* (2006.01)

(52) U.S. Cl. .................................. 714/774; 714/776

(58) Field of Classification Search ................. 714/774
See application file for complete search history.

(56) References Cited

U.S. PATENT DOCUMENTS 6,978,412 B1 * 12/2005 Reents et al. ............... 714/774
7,010,731 B2 * 3/2006 Paiss ........................... 714/776
2003/0126540 A1 * 7/2003 Lee et al. ..................... 714/774
2006/0251176 A1 * 11/2006 Hatabu et al. ............ 375/240.27

FOREIGN PATENT DOCUMENTS

| JP | 9-261740 | 10/1997 |
|----|----------|---------|
| JP | 2001-177466 | 6/2001 |
| JP | 2001-223670 | 8/2001 |
| JP | 2001-320347 | 11/2001 |

OTHER PUBLICATIONS

Y. Okumura, et al. Variable Rate Data Transmission with Blind Rate Detection for Coherent DS-CDMA Mobile Radio. Electronic Letters, Sep. 26, 1996, pp. 1865-1866, vol. 32, No. 20.
Y. Okumura, et al. Variable Rate Data Transmissions on Single Code-Channel in DS-CDMA. IEICE, Feb. 27, 1996 pp. 55-60, RCS95-166.
International Preliminary Examination Report dated Nov. 13, 2002.

* cited by examiner

*Primary Examiner*—R. Stephen Dildine
(74) *Attorney, Agent, or Firm*—Katten Muchin Rosenman LLP

(57) ABSTRACT

When it is detected that a CRC check is acceptable in Blind Transport Format Detection (BTFD) processing, the BTFD processing is halted from this moment onward, the number of bits of voice code of each class is decided based upon the bit rate of each class in a bit-rate combination that prevails when the CRC check is acceptable, the voice code of each class is demultiplexed from receive data based upon the number of bits and the demultiplexed voice code is input to a voice codec.

12 Claims, 20 Drawing Sheets

FIG. 10 PRIOR ART

| FRAME TYPE | CLASS A (bit) | CLASS B (bit) | CLASS C (bit) | REMARKS |
|---|---|---|---|---|
| 0000 | 42 | 53 | 0 | 4.75Kbps |
| 1000 | 49 | 54 | 0 | 5.15Kbps |
| 0100 | 55 | 63 | 0 | 5.90Kbps |
| 1100 | 58 | 76 | 0 | 6.70Kbps |
| 0010 | 61 | 87 | 0 | 7.40Kbps |
| 1010 | 75 | 84 | 0 | 7.95Kbps |
| 0110 | 65 | 99 | 40 | 10.2Kbps |
| 1110 | 81 | 103 | 60 | 12.2Kbps |
| 0001 | 39 | 0 | 0 | GSM_Amr_Comfort_Noise_frame (BACKGROUND NOISE) |
| 1111 | 0 | 0 | 0 | No Transmission/Reception (SILENCE) |

FIG. 13 PRIOR ART
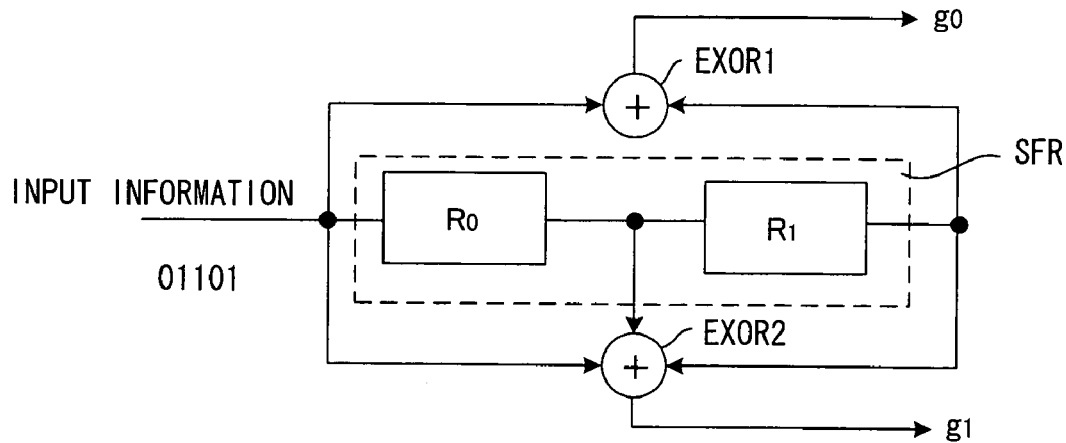
FIG. 14 PRIOR ART
| INPUT | INITIAL STATE: | SHIFT REGISTER | | OUTPUT | |
|---|---|---|---|---|---|
| | | 0 | 0 | $g_0$ | $g_1$ |
| | | $R_0$ | $R_1$ | | |
| 0 | → | 0 | 0 | → 0 | 0 |
| 1 | → | 1 | 0 | → 1 | 1 |
| 1 | → | 1 | 1 | → 1 | 0 |
| 0 | → | 0 | 1 | → 1 | 0 |
| 1 | → | 1 | 0 | → 0 | 0 |
state
FIG. 15 PRIOR ART
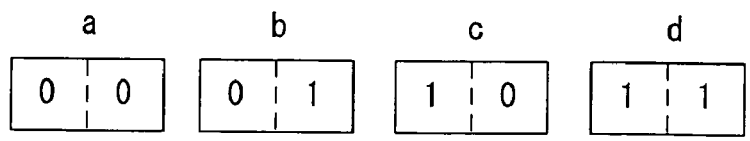

(a)

(b)

```
1  1  1  0  0  0    ----- RECEIVE DATA A
                          DATA OUTPUT B
0  0  0  0  0  0          ASSUMING PATH (1)

1  1  1  0  0  0    ----- A ⊕ B
                          ∴ PATH METRIC VALUE = 3
```

(c)

```
1  1  1  0  0  0    ----- RECEIVE DATA A
                          DATA OUTPUT B
1  1  0  1  1  1          ASSUMING PATH (2)

0  0  1  1  1  1    ----- A ⊕ B
                          ∴ PATH METRIC VALUE = 4
```

RECEIVING APPARATUS AND RECEIVING METHOD IN CDMA COMMUNICATION SYSTEM

CROSS-REFERENCE TO RELATED APPLICATION

The present application is a continuation of International Application No. PCT/JP01/07562 which was filed on Aug. 31, 2001.

BACKGROUND OF THE INVENTION

This invention relates to a receiving apparatus and a receiving method in a CDMA communication system. More particularly, the invention relates to a receiving apparatus and a receiving method in a CDMA communication system in which voice code of a prescribed transmission time interval encoded by a voice encoding scheme such as AMR (Adaptive Multi-Rate) is divided into a plurality of classes, the voice code in each class is expressed by a number of bits that conforms to a prescribed bit rate, a check code of a fixed length is attached to voice code of a prescribed class, the voice code of each class is subjected to error-correction encoding processing, and voice code that has undergone error-correction encoding processing in each class is transmitted upon being multiplexed in such a manner that the class with the attached check code is brought to the forefront.

When a terminal device receives multiplexed data of a plurality of transport channels TrCH from a base station in a W-CDMA system compliant with the 3GPP standard, the terminal device decodes a TFCI (Transport Format Indicator) bit that has been mapped to each frame every frame of 10 ms. On the basis of the TFCI bit, the device identifies the bit rate of each transport channel TrCH, i.e., the information bit length per unit time (namely the transport format). On the basis of the identified transport format, the terminal device thenceforth demultiplexes the transport data of each transport channel from the multiplexed data that has been received.

In relation to a channel having a low user rate, there are cases where no TFCI bit exists. At such time, the transport format of each transport channel TrCH is discriminated by BTFD (Blind Transport Format Detection) processing that utilizes a CRC check, and transmit data of each transport channel TrCH is reproduced from the multiplexed data received.

In accordance with the 3GPP standard, BTFD processing is applied when voice code is received. More specifically, in accordance with, e.g., the AMR scheme, a voice codec on the transmitting side expresses a voice signal by ① an LSP parameter expressing the human vocal tract, ② a pitch-period component expressing the periodicity of voice, ③ a noise component included in voice, ④ gain of the pitch-period component and ⑤ gain of the noise component, extracts each of these elements from input voice, quantizes these elements and outputs the quantized data as voice code. The LSP parameter, pitch-period component and pitch gain are important and hence are assigned to a first transport channel (TrCH of Class A). The noise component and noise gain may contain a small amount of error without critical consequences and therefore are assigned to second and third transport channels (TrCH of Classes B and C).

The transmitting apparatus expresses the voice code of each class obtained from the voice codec by a number of bits conforming to each prescribed bit rate, attaches a fixed-length check code to the voice code of Class A, subjects the voice code of each class to error-correction encoding processing and transmits voice code, which has undergone error-correction encoding processing in each class, upon multiplexing it in such a manner that Class A having the attached check code is brought to the forefront.

The receiving apparatus discriminates the transport format (bit length) of the transport channel TrCH of each of Classes A to C by BTFD processing utilizing the CRC check, extracts the received voice code of each class based upon the bit length and inputs this voice code to a voice codec. The latter reproduces the voice signal from the voice code and outputs the voice signal. On the receiving side, the receive physical channel undergoes a transition to a logical channel in a higher layer. During the transition from the physical channel to the logical channel, a transition is made to the transport channel (TrCH) state. In voice there are three channels of TrCH and one logical channel, and the transport channels are of Class A, Class B, Class C.

FIG. 9 is a block diagram of a mobile station according to the prior art. When a transmission is made, a voice codec 1 converts a voice signal that enters from a microphone 2 to voice code by means of the AMR encoding scheme every transmission time interval TTI of 20 ms and inputs the voice code to a data distributor 4 as voice code of Classes A to C. In accordance with directions from the voice codec, the data distributor 4 selectively inputs the voice code of Classes A to C to transmit buffers $5_1$ to $5_3$ the length of encoding time whereof is 20 ms.

The transmit buffers $5_1$ to $5_3$ write the voice code (transport data) of classes A to C to buffer memories (not shown) every 20 ms and input the data to encoding processors $6_1$ to $6_3$, respectively, which constitute the succeeding stage.

The encoding processors $6_1$ to $6_3$ each encode the 20-ms transport data (after attaching a CRC check bit with regard to Class A) in accordance with convolutional or turbo encoding and input the encoded data to a multiplexer 7 upon dividing it into frame units (units of 10 ms). The multiplexer 7 multiplexes the error-corrected encoded data, which enters from the encoding processors $6_1$ to $6_3$, every 10 ms, creates one frame's worth of multiplexed data and transmits the multiplexed encoded data as in-phase component data.

A control signal generator 8 outputs control data such as a pilot PILO, TFCI and TPC as quadrature-component data at a fixed symbol rate. A QPSK spreader 9a of a QPSK spreader & modulator 9 subjects the entered in-phase component (I-channel component) and quadrature component (Q-channel component) to spread-spectrum modulation using a predetermined spreading code, applies a DA conversion and inputs the resultant signal to a QPSK orthogonal modulator 9b. The latter subjects the I-channel signal and Q-channel signal to QPSK orthogonal modulation, and a radio transmitter 10 frequency-converts (IF→RF) the baseband signal output from the orthogonal modulator to a high-frequency signal, performs high-frequency amplification, etc., and transmits the amplified signal from an antenna $ANT_T$.

At reception, a radio receiver 11 subjects a high-frequency signal received from an antenna $ANT_R$ to a frequency conversion (RF→IF conversion) to obtain a baseband signal, after which it subjects the baseband signal to orthogonal detection to generate in-phase component (I component) data and a quadrature component (Q component) data, applies an AD conversion and inputs the results to a despreading demodulator 12. The latter applies despread processing to the I- and Q-component signals using a code identical with that of the spreading code, demodulates (synchronously detects) the sent encoded data and inputs the result to a demultiplexer 13.

The demultiplexer 13 demultiplexes the data of Classes A to C from the input multiplexed data frame by frame and inputs the resultant data to decoding processors $14_1$ to $14_3$, respectively. The processors $14_1$ to $14_3$ each join two items of 10-ms data to form data having a transmission time interval TTI of 20 ms, subsequently subject the data of classes A to C to error-correction decoding processing to decode the original voice code data of classes A to C, respectively, and write the decoded data to buffer memories of receive buffers $15_1$ to $15_3$. The receive buffers $15_1$ to $15_3$ read the voice-code data of Classes A to C out of the buffer memories synchronously and input the data to the data distributor 4. The latter inputs the voice code data of each class to the voice codec 1. The latter reproduces the voice signal from the voice code and outputs the voice signal from a speaker 3.

To summarize the foregoing, a channel codec 21 on the transmitting side of a W-CDMA system accepts voice code data of Classes A to C from a higher layer, executes encoding processing for every transport channel (TrCH) of Classes A to C, multiplexes the encoded data and transmits the data upon mapping it to a physical channel. Conversely, a channel codec 22 on the receiving side demultiplexes data for every transport channel (TrCH) of Classes A to C from multiplexed data on a physical channel and delivers the results (voice code of Classes A to C) to a higher layer. As mentioned above, the voice codec 1 on the transmitting side converts a voice signal that enters from the microphone 2 to voice code by means of the AMR encoding scheme every transmission time interval TTI of 20 ms and inputs the voice code to the data distributor 4 as voice code of Classes A to C. The bit rate (bit length) of the voice code of each class is specified by the base station when a call is connected. That is, when a call is connected, the base station reports a plurality of combination candidates of bit rates of each of the Classes A to C to the originating terminal and terminating terminal and specifies at which bit-rate combination voice code should be transmitted. FIG. 10 is an example of voice formats (candidates of bit-rate combinations) in accordance with the 3GPP standard. This illustrates bit lengths for expressing voice code of Classes A to C encoded every TTI of 20 ms. Ten types of bit-rate combinations are indicated in FIG. 10 and frame-type numbers have been attached to identify the combinations. Classifying the bit-rate combination candidates, we have ① a silence bit-rate combination (1111), ② a background-noise bit-rate combination (0001) and ③ voice-activity bit-rate combinations (0000 to 1110). In case of voice activity, which bit-rate combination is to be used is decided by the communication traffic at the time the call is connected. More specifically, when there is no traffic, an exchange of high-quality voice data is performed at a high bit rate of 12.2 kbps. Conversely, when traffic is heavy, a change is made to a low bit rate in accordance with the degree of congestion to reduce the bit length of data sent and received. It should be noted that once the voice-activity bit-rate combination has been decided when the call is connected, this rate is maintained until the call ends, and there is no changeover of bit rate in the interim. Under these circumstances, the voice-activity bit-rate combination is only that of frame type 1110 for 12.2 kbps.

Background noise is necessary in order to impart naturalness in terms of the sense of hearing. In human conversation there exist intervals with speech (voice activity segments) and intervals without speech (silence segments) during which conversation pauses or in which one waits silently for the other party to speak. In general, background noise produced in an office, by vehicles or from the street is superimposed upon speech. In actual voice communication, therefore, there are intervals (voice activity segments) in which background noise is superimposed upon speech, and intervals (silence segments) consisting solely of background noise. This means that a large-scale reduction in amount of transmission can be achieved by detecting silence segments and halting the transmission of information in the silence segments. In silence segments, however, either no particular action is taken or there is no other choice but to output a certain level of noise. This produces an unnatural condition that seems odd to the listener. Accordingly, when a state of silence continues for seven consecutive silence frames, as shown in FIG. 11, one background-noise frame that is necessary to generate background noise is inserted, thereby making possible natural reproduction without strangeness on the receiving side while reducing the quantity of background noise transmitted.

When a call is connected, the base station reports the bit-rate combination candidates of Classes A to C shown in FIG. 10 to the originating and terminating terminals and specifies, by means of the frame-type number, at which bit-rate combination voice code should be transmitted. The voice codec 1 (FIG. 9) of the originating terminal expresses the voice code of each class by the bit length of which it has been instructed by the base station. The channel codec 21 on the transmitting side attaches a CRC check code of fixed length to the voice code of Class A, subjects the voice code of each class to error-correction encoding processing, divides the encoded data into frame units (units of 10 ms), multiplexes the error-corrected encoded data of each class every 10 ms, creates one frame of multiplexed data and transmits the same. The channel codec 22 on the receiving side of the terminating terminal demultiplexes the data of each class from the multiplexed data and applies decoding processing to each item of data.

FIG. 12 shows the data structure of each TTI=20 ms class after demultiplexing, in which (A) is a diagram showing the data structure of Class A and (B), (C) are diagrams showing the data structures of Classes B, C, respectively. The data of Class A is composed of ① a voice code portion A1 of Class A having a bit length that conforms to the frame type indicated by the base station, ② a fixed-length CRC check code portion A2 and ③ an empty portion A3. The data of Classes B, C is composed of ① voice code portions B1, C1 having bit lengths that conform to the frame type indicated by the base station, and ② empty portions B2, C2. It should be noted that although no transmission of signals takes place in the empty portions, signals based on noise are transmitted.

The channel codec 22 must accurately extract only the voice code portions A1, B1, C1 (remove signals ascribable to noise) from the data having the structure shown in FIG. 12 and input these portions to the voice codec. Accordingly, in the prior art, demultiplexing is performed upon discriminating the bit lengths of the voice code of each of the classes by BTFD (Blind Transport Format Detection) utilizing a CRC check. Specifically, the channel codec 22 assumes that the voice code of Class A is expressed by the bit counts (0, 39, 42, 49, . . . , 81) per unit time of Class A in each frame type shown in FIG. 10 and applies error-correction decoding processing to the receive data. It should be noted that numbers $n_{end}$=1, 2, . . . are assigned in order of increasing bit count.

This is followed by investigating whether one decoded result is correct in regard to all patterns by a CRC check applied to the decoded data, after which a search is made for decoded results determined to be correct by the investigation. Reference is then had to FIG. 10 to obtain the bit count per unit time (i.e., the bit rate) of each class in the bit-rate combinations prevailing at this time, and it is determined that this bit count is the bit count that expresses the voice code of each class. If the bit length of each class is determined, the channel codec 22 on the receiving side accurately extracts only the voice code portions from the data having the structures shown in FIGS. 12(A) to (C) and inputs these portions to the voice codec.

BTFD processing will be described below. First, however, convolutional encoding and Viterbi decoding, which are necessary in terms of comprehending BTFD processing, will be described.

FIG. 13 shows an example of a convolutional encoder. The encoder has a 2-bit shift register SFR and two exclusive-OR circuits EXOR1, EXOR2. The EXOR1 outputs the exclusive-OR $g_0$ between an input and $R_1$, and the EXOR2 outputs the exclusive-OR $g_1$ (outputs "1" when "1" is an odd number and "0" otherwise) between the input and $R_0$, $R_1$. Accordingly, the input/output relationship of the convolutional encoder and the state of the shift register SFR in case of input data 01101 are as shown in FIG. 14.

The content of the shift register SFR of the convolutional encoder is defined as the state, and there are four states, namely 00, 01, 10 and 11, as shown in FIG. 15, which are expressed by state a, state b, state c and state d, respectively. With the convolutional encoder of FIG. 13, the outputs ($g_0$, $g_1$) and the next state are uniquely decided depending upon which of the states a to d is indicated by the state of the shift register SFR and depending upon whether the next item of input data is "0" or "1". FIG. 16 is a diagram showing the relationship between the states of the convolutional encoder and the inputs and outputs thereof, in which the dashed lines indicate a "0" input and the solid lines a "1" input. For example, (1) if "0" is input in state a, the output is 00 and the state is a; if "1" is input, the output is 11 and the state becomes c;

(2) If "0" is input in state b, the output is 11 and the state is a; if "1" is input, the output is 00 and the state becomes c;

(3) if "0" is input in state c, the output is 01 and the state becomes b; if "1" is input, the output is 10 and the state becomes d; and (4) if "0" is input in state d, the output is 10 and the state becomes b; if "1" is input, the output is 01 and the state becomes d.

If the convolutional codes of the convolutional encoder shown in FIG. 13 are expressed in the form of a lattice using the above input/output relationship, the result is as shown in FIG. 17(a), where k signifies the time at which a kth bit is input and the initial (k=0) state of the encoder is a(00). The dashed line indicates a "0" input and the solid line a "1" input, and the two numerical values on the lines are the outputs ($g_0$, $g_1$). Accordingly, it will be understood that if "0" is input in the initial state a(00), the output is 00 and the state is state a, and that if "1" is input, the output is 11 and the state becomes state c.

Upon referring to this lattice-like representation, it will be understood that if the original data is 11001, state c is attained via the path indicated by the two-dot dashed line in FIG. 17(b), and that the outputs of the encoder become

11→10→10→11→11

If the ideal error-free state is assumed, in which the receive data ($g_0$, $g_1$) of the decoder is 11→10→10→11→11, a path indicated by the two-dot dashed line shown in FIG. 18(a) is obtained. By making the dashed lines "0"s and the solid lines "1"s, the decoded result 11001 can be obtained, as illustrated in FIG. 18(b). In actuality, however, there are many cases where the receive data contains an error. If the fifth bit develops an error so that hard-decision receive data ($g_0$, $g_1$) is 11→10→00→11→11, as shown in FIG. 18(c), confusion occurs at data-input time k=2 as to whether to branch to 10 or 01 (error count ERR=1). If 10 is construed to be the state and the upper path is selected, state c is reached without confusion at k=3 and k=4. Accordingly, the error count becomes error count ERR=1 on the path of the two-dot dashed line and the decoded result at this time becomes 11001. On the other hand, if 01 is construed to be the state and the lower path is selected at data-input time k=2, then confusion occurs at time k=3 also as to where to branch and total error count ERR=2 is the result. Thereafter, and in similar fashion, paths are selected and, when branching confusion occurs, ERR is counted up. The following results are eventually obtained:

total error count ERR when decoded result is 11001: 1
total error count ERR when decoded result is 11100: 2
total error count ERR when decoded result is 11110: 3
total error count ERR when decoded result is 11111: 4

Accordingly, the decoded result 11001 for which the error count ERR is smallest is selected and output. If this arrangement is adopted, the original data 11001 can be reconstructed correctly even if the receive data is erroneous.

Processing for thus obtaining the error counts ERR of all possible paths based upon the receive data and decoding the original data from the path for which the error count is smallest is complicated. Accordingly, Viterbi decoding is performed as set forth below. It will be assumed that the receive data is 111000 as the result of a hard decision. At state a where k=3 in FIG. 18, there are two input paths. If only the relevant paths are extracted and drawn, the result is as shown in FIG. 19(a). The two paths are path (1) and path (2) shown in the drawing. If the hamming distances (referred to hereafter as "path metric values") between the receive data and the decoded data obtained on respective ones of the paths are calculated, the results will be 3 and 4, as illustrated in FIGS. 19(b), (c), respectively.

On the basis of the results of calculation, the path metric value for which the assumption is "state a reached by following path (1)" is smaller than that for which the assumption is "state a reached by following path (2)". Accordingly, since path (1) has a high reliability in that it is the path conforming to the data transmitted, this path is left as a survivor and the other path is discarded. If this processing for adopting or rejecting paths is executed successively with regard to each of the states a to d starting from time k=1, it is possible to find the paths for which the path metric values to reach each of the states a, b, c, d at any time k are smallest (the paths of minimum error). Similar adopt-or-reject processing can continue from this point onward.

Thus, when N-items of receive data have been input, the path for which the path metric value is smallest is decided from among the four paths of minimum path metric value (minimum error) leading to respective ones of the states a, b, c, d at k=N, and the decoded data is output based upon this path. FIG. 20 illustrates the shortest paths leading to respective ones of the states a to d at each time k (=1 to 5) when the receive data is 11 10 00 11 11. The numerical values on the lines are the path metric values. At data-input time k=5, the path metric value of the path to state c is the smallest. Accordingly, if trace-back processing is executed along this path from state c at time k=5, data 11001 will be obtained. This is the decoded data. The above decoding algorithm is the Viterbi algorithm.

It should be noted that if we write $a_0(n_{end})$ for the path metric value of state a (=state 0) at data-input time k=$n_{end}$, write $a_{max}(n_{end})$ for the maximum path metric value among the states a to d and write $a_{min}(n_{end})$ for the minimum path metric value among the states a to d, then the characteristic will be such that the smaller the error with respect to the encoded data, the more conspicuous the relation $a_0(n_{end})$ >$a_{min}(n_{end})$ becomes. More specifically, the characteristic is such that the smaller the error with respect to the encoded data, the larger $a_0(n_{end})$ and the smaller $a_{min}(n_{end})$. Consequently, the ratio of $[a_0(n_{end})-a_{min}(n_{end})]$ to $[a_{max}(n_{end})-a_{min}(n_{end})]$ increases. According to this characteristic, the smaller the error, the smaller the value of $S(n_{end})$, which is given by the following equation:

$$S(n_{end}) = -10 \log [\{a_0(n_{end})-a_{min}(n_{end})\}/\{a_{max}(n_{end})-a_{min}(n_{end})\}] \text{ [dB]} \quad (1)$$

In BTFD processing, the $S(n_{end})$ value is used. BTFD processing will be described in detail in accordance with FIG. 21. In outline, however, the following processing is executed in stages:

(a) A plurality bit-rate candidates is specified.

(b) Viterbi decoding is performed in order of increasing bit rate (increasing $n_{end}$) with regard to the bit rate of class A in each bit-rate candidate, Add-Compare-Select (referred to as "ACS" below) processing is executed, path metric values are found and $S(n_{end})$ is calculated in accordance with Equation (1) using these path metric values.

(c) $S(n_{end})$ and a threshold value D are judged in terms of their magnitudes;

(d) If $S(n_{end})$ is equal to or less than the threshold value D, trace-back processing is executed from the state in which the path metric value is smallest at the final bit position.

(e) A CRC check is applied to decoded data obtained by trace-back processing.

(f) If the CRC check is acceptable, the present $S(n_{end})$ and $S_{min}$, which is the smallest value thus far, are compared.

Steps (b) to (f) are executed a number of times equivalent to the number of bit-rate candidates and the candidate for which the result of the CRC check is acceptable and, moreover, which eventually is the most reliable, i.e., the candidate for which $S(n_{end})$ is smallest, is selected. It is decided that the number of bits of each class in this bit-rate candidate is a number of bits that expresses the voice code of each class. If the result of (c) is that $S(n_{end})$ is greater than the threshold value D, or in other words, if the reliability is low, the processing of (d), (e), (f) is not executed.

FIG. 21 if a flowchart of BTFD processing.

Since bit-rate candidates (FIG. 10) are specified from within a host application, numbers are assigned in order of increasing bit rate (number of bits per unit time) of Class A in the manner $n_{end}$=1, 2, 3, . . . (step 101). Next, initialization is performed as follows: $n_{end}$=1, $S_{min}$=D, $n_{end}'$=0 (step 102).

Thereafter, ACS processing is executed up to the $n_{end}$ position (step 103) and $S(n_{end})$ is calculated in accordance with Equation (1) (step 104). If $S(n_{end})$ has been obtained, then this $S(n_{end})$ and the threshold value D are compared (step 105).

If $S(n_{end}) \leq D$ holds, trace-back processing is executed from the state in which the path metric value at the $n_{end}$ position is smallest (step 106). A CRC check is applied to the decoded data obtained by trace-back processing (step 107).

If the CRC check is OK, then the present $S(n_{end})$ and $S_{min}$, which is the minimum value thus fare, are compared (step 109).

If $S_{min}>S(n_{end})$ holds, the minimum value is updated in the form $S_{min}=S(n_{end})$ and $n_{end}$ at this time, namely the number of bits of the voice code in Class A, is stored in the form $n_{end}'=n_{end}$ (step 110). It is then determined whether $n_{end}$ is the final candidate (step 111). If it is not the final candidate, $n_{end}$ is incremented by the operation $n_{end}=n_{end}+1$ (step 112) and processing from step 103 onward is executed.

If $S(n_{end})>D$ is found to hold at step 105, or if a "NO" decision is rendered by the CRC check at step 108, or if $S_{min} \leq S(n_{end})$ is found to hold at step 109, then the processing of step 111 is executed.

If the above processing has been repeated with regard to all candidates $n_{end}$, a "YES" decision will be rendered at step 111 and then it is determined whether $n_{end}'=0$ holds (step 113). If the decision is "YES", an error is output (step 114). If $n_{end}'=0$ does not hold, however, it is judged that $n_{end}'$ is the bit rate (number of bits) of Class A in the most reliable bit-rate combination and this is output (step 115). This is followed by referring to the bit-rate combination candidates of FIG. 10 to find the bit rates (numbers of bits) of the other classes.

FIG. 22 is a block diagram of a channel codec on the receiving side for executing BTFD processing. A separator/combiner (not shown) combines, on a per-class basis, data that has been separated on a per-class basis from multiplexed data, thereby creating data of each class, the TTI of the data being 20 ms. A receive-data memory 22a receives and holds the data of each class, where TTI=20 ms holds. A Viterbi decoder 22b includes an ACS an ACS operation/path-metric memory/path memory unit 31, a trace-back unit 32 and a post-trace-back memory 33. The path memory stores, at each time k, each of four paths, for which the path metric values are smallest, leading to respective ones of the states a, b, c, d, and the path-metric memory stores the path metric value of each path. In the example where k=⑤ holds in FIG. 20, we have the following:

path leading to state a is 111000 and path metric value is 2;

path leading to state b is 111110 and path metric value is 3;

path leading to state c is 11001 and path metric value is 1; and path leading to state d is 111111 and path metric value is 3.

The trace-back unit 32 decides the path for which the path metric value is smallest from among the four paths leading to the states a, b, c, d, executes trace-back processing along this path, obtains the decoded data and stores it in the post-trace-back memory 33.

With regard to Class A, the Viterbi decoder applies Viterbi decoding processing to data up to the $n_{end}$ position. With regard to Classes B, C, the data lengths are not known and therefore the Viterbi decoder executes Viterbi decoding processing up to the tail-end position, stores in the path memory, at each time k corresponding to each data-length candidate, four paths, for which the path metric values are smallest, leading to respective ones of the states a, b, c, d, and stores each of the path metric values in the path-metric memory.

A CRC operation unit 22c performs a CRC check operation based upon the result of decoding Class A. A post-CRC check memory 22d corresponds to the receive buffer 15 in FIG. 9 and stores decoded data (voice code) of Class A prevailing when the CRC check is OK and, moreover, Smin holds. Further, the trace-back unit obtains the path for which the path metric value is smallest from among the four paths at time k corresponding to the bit counts of Classes B, C decided by BTFD processing, executes trace-back processing along this path, acquires the voice codes of Classes B, C and stores them in the post-CRC check memory 22d.

A BTFD controller 22e executes BTFD processing in accordance with the flowchart of FIG. 21 and decides the bit count of the voice code of each class. A candidate-rate setting/holding unit 34 holds a plurality of bit-rate candidates reported from a higher layer (host application) 41 and sets prescribed bit rates in the receive-data memory 22a.

The higher layer (host application) 41 reports the candidate rate information (the bit lengths of Classes A, B, C shown in FIG. 10) to the BTFD controller 22e in advance, and the candidate-rate setting/holding unit 34 holds the reported candidate rate information (bit-rate combination information).

Meanwhile, receive data of each class that has been separated by a separator (not shown) is held in the receive-data memory 22a, and the candidate-rate setting/holding unit 34 of BTFD controller 22e sets the bit rates of Class A of the plurality of bit-rate combination candidates in the receive-data memory 22a in order of increasing bit rate.

The receive-data memory 22a that has received the bit rates inputs the receive data of Class A whose numbers of bits conform to the above bit rates to the ACS operation/path-metric memory/path memory unit 31 of the Viterbi decoder. The ACS operation/path-metric memory/path memory unit 31 executes the ACS operation, holds the path metric values, which are the results of this operation, in an internal path-metric memory and reports the maximum path metric value $a_{max}$ ($n_{end}$), the minimum path metric value $a_{min}$ ($n_{end}$) and the path metric value $a_0$ ($n_{end}$) of state a (state 0) to the BTFD controller 22e.

The BTFD controller 22e calculates $S(n_{end})$ and compares $S(n_{end})$ and the threshold value D. If it is judged as a result that trace-back is to be performed, then the BTFD controller 22e inputs trace-back start-up information to the trace-back unit 32. In response, the trace-back unit 32 performs trace-back and stores the decoded results up to the $n_{end}$ position in the post-trace-back memory 33.

The receive-data memory 22a thenceforth inputs, to the Viterbi decoder 22b, the receive data of Classes B, C whose bit counts conform to the bit rates of Classes B, C in the maximum-rate combination (frame type 1110 in the example of FIG. 10). The Viterbi decoder 22b executes Viterbi decoding processing and stores the path obtained in the path memory. That is, as mentioned above, the Viterbi decoder 22b stores, at each time k corresponding to each data-length candidate, four paths, for which the path metric values are smallest, leading to respective ones of the states a, b, c, d, and stores each of the path metric values in the path-metric memory.

If the decoding of Class A is finished, the post-trace-back memory 33 inputs, to the CRC operation unit 22c, decoded results in an amount equivalent to the bit count+number of CRC codes of Class A specified by the bit-rate combination information reported from the BTFD controller 22e. The CRC operation unit 22c performs a CRC check operation and reports the CRC check results to the BTFD controller 22e. On the basis of the CRC check results, the BTFD controller 22e, in accordance with the processing flowchart of FIG. 21, compares Smin and $S(n_{end})$ and updates the values of $S_{min}$, $n_{end}'$ if $S_{min} > S(n_{end})$ holds. If the CRC check is OK and, moreover, the condition $S_{min} > S(n_{end})$ holds, then the decoded result from which the CRC check code has been deleted is stored, instead of the decoded result thus far, in the post-CRC check memory 22d. If the BTFD controller 22e thenceforth executes the above processing for the amount of bit-rate combination candidates with regard to Class A, then the controller will recognize that the number of bits conforming to the value of $n_{end}'$ at this time is the number of bits of the voice code of Class A. It should be noted that voice code data of Class A whose number of bits conforms to the value of $n_{end}'$ has been stored in the post-CRC check memory 22d previously.

Next, the BTFD controller 22e identifies the numbers of bits of voice code of Classes B, C from bit-rate combination candidate table (FIG. 10) and the numbers of bits of Class A. The BTFD controller 22e thenceforth starts up the trace-back unit 32. The latter obtains, from the path memory, the path for which the path metric value is smallest from among four paths at time k corresponding to the bit lengths of Classes B, C, executes trace-back processing along this path, acquires the voice codes of Classes B, C and stores the voice code in the post-CRC check memory 22d via the CRC operation unit 22c. When the voice codes of Classes A, B, C have been obtained, the post-CRC check memory 22d sends these voice codes to the voice codec 1 as one logical channel, and the voice codec 1 reconstructs the voice signal from the voice codes received.

With conventional BTFD processing in line with the 3GPP standard, Viterbi processing and the CRC check operation are executed in order of greater bit rate, i.e., data length, as is evident from the processing flowchart of FIG. 21, the data length of the voice code of each class of maximum reliability is decided after processing has finally been applied to all bit-rate combination candidates, voice code data of each class is cut from the receive data and this data is input to the voice codec. With this conventional method, however, all rate candidates are processed every time. As a consequence, a problem which arises is that the amount of processing is very great and there is an increase in current consumed.

In the conventional BTFD processing sequence, it is assumed that the CRC check will be acceptable even in data lengths that differ from that of the true voice code. As a result, detection processing is executed with regard to all candidates and bit lengths of the voice codes of each of the classes are decided based upon the best candidate in terms of the characteristics. However, the probability that an acceptable CRC check will occur for data lengths other than the true data length originally transmitted is $2^{-12}$, where CRC SIZE=12 bits holds, and the improvement in characteristics achieved by this processing can only be considered to be small.

Further, consider a case where bit-rate combination candidates are of three types, namely for silence, for background noise and for 12.2 k voice data. During a call, the 12.2 k voice data will continue to some extent. Nevertheless, in the conventional sequence, Viterbi decoding processing and the CRC check operation are executed every time in the following order: silence, background noise, 12.2 k voice data (namely in order of increasing rate), and ultimately the fact that the 12.2 k voice data is correct is detected and the data is received. The problem which arises is a large amount of processing and increased consumption of current.

Further, in the conventional BTFD processing sequence, the results of decoding for each class for which Viterbi decoding, trace-back processing and the CRC operation have been completed are stored temporarily in the post-CRC check memory 22d. Thus, according to the conventional BTFD processing sequence, both the post-trace-back memory and post-CRC check memory are required. The problem which arises is a great increase in the number of memories used.

SUMMARY OF THE INVENTION

Accordingly, an object of the present invention is to arrange it so that the amount of processing and current consumed in BTFD processing can be reduced and, moreover, so that it is possible to identify the number of bits of voice code of each class correctly, demultiplex the voice code of each class correctly and input the code to a voice codec even though the amount of processing and the consumed current are reduced.

Another object of the present invention is to arrange it so that the number of memories used in BTFD processing can be reduced and, moreover, so that it is possible to identify the number of bits of voice code of each class correctly even though the number of memories used is reduced.

According to a first aspect of the present invention, when it is detected that a CRC check is acceptable in BTFD processing, the BTFD processing is halted from this moment onward, the number of bits of voice code of each class is decided based upon the bit rate of each class in a bit-rate combination that prevails when the CRC check is acceptable, the voice code of each class is demultiplexed from receive data based upon the number of bits and the demultiplexed voice code is input to a voice codec. If this arrangement is adopted, the amount of processing and current consumed in BTFD processing can be reduced. Moreover, even though these are reduced, the number of bits of voice code of each class can be identified and the voice code of each class can be demultiplexed correctly and input to the voice codec.

With the 3GPP standard, the size of a CRC check code attached to Class A is defined as 12 bits. It is possible to detect an error of one or more bits among $2^{12}$ bits by a CRC check of this size. In all of the bit-rate combinations shown in FIG. 10, the bit rates of Class A are 0 to 81 bits, which are very small in comparison with $2^{12}$ bits. This means that the probability that a bit rate for which a CRC check was acceptable is no good and that another bit rate is the right one is very low.

According to a second aspect of the present invention, Viterbi decoding and the CRC check are performed in order of increasing bit rate until an acceptable CRC check is obtained in BTFD processing. However, when an acceptable CRC check is obtained and the bit rate of Class A has been definitely determined, the bit-rate combination prevailing at this time is held for the period of the transmission time interval TTI and succeeding BTFD processing following elapse of TTI is started from the bit rate of Class A in the bit-rate combination that has been stored. If this arrangement is adopted, the probability that the bit length of each class will be discriminated in a short period of time will be high and the amount of processing and current consumed in BTFD processing can be reduced. Moreover, even though these are reduced, the number of bits of voice code of each class can be identified and the voice code of each class can be demultiplexed correctly-and input to the voice codec.

The number of bits of the voice code of each class is decided by the voice codec on the transmitting side. In the case of a voice call, it is usual for a voice activity segment (a rate of 12.2 kbps) and a silence segment to each continue in units of seconds. The unit of the TTI in voice code is 20 ms. This means that the intervals of changes in the voice activity segment/silence segment in a voice call will be long in comparison with the TTI unit, and the probability that the rate will change between the present TTI and the next TTI will be low in comparison with the probability that there will be no change. Accordingly, the second aspect of the present invention utilizes the fact that if, once the bit rate has been definitely determined, BTFD processing is executed at the same bit rate even in the next TTI, then the probability that an acceptable CRC check will be obtained and that the bit rate will be definitely determined at this time rises.

According to a third aspect of the present invention, silence states are counted and, if silence states are detected seven times in succession in the past, then, in the next TTI, BTFD processing is started from the bit rate that conforms to background noise. The reason for this is that in accordance with the specifications of a 3GPP voice codec, it is defined that one segment of background noise is inserted in a silence state of 8×TTI. If this arrangement is adopted, the amount of processing involved in BTFD processing can be reduced.

According to a fourth aspect of the present invention, frame-type information (bit-rate combination of each class) definitely determined by BTFD processing is reported from a BTFD controller to a voice codec. On the basis of the frame-type information, the voice codec reads the voice code of Class A out of a post-CRC operation memory and reads voice codes of Classes B, C out of a post-trace-back memory. If this arrangement is adopted, it will no longer be necessary to hold the voice codes of Classes B, C in the post-CRC operation memory and, hence, the number of memories used can be reduced. Furthermore, it is also possible to adopt an arrangement in which the post-CRC operation memory is deleted and the voice codes of Classes A, B, C are read out of the post-trace-back memory based upon frame-type information reported by the voice codec. If this arrangement is adopted, the post-CRC operation memory can be deleted and a further reduction in the number of memories used can be achieved.

BRIEF DESCRIPTION OF THE DRAWINGS

FIG. 10 is a table for describing voice formats (bit rates of Classes A to C) in accordance with the 3GPP standard;

FIG. 13 is an example of a convolutional encoder;

FIG. 14 is a diagram useful in describing the relationship between inputs and outputs of a convolutional encoder;

FIG. 15 is a diagram useful in describing the states of a convolutional encoder;

DESCRIPTION OF THE PREFERRED EMBODIMENTS

(A) Structure of Mobile Terminal in W-CDMA System

Figure 1:
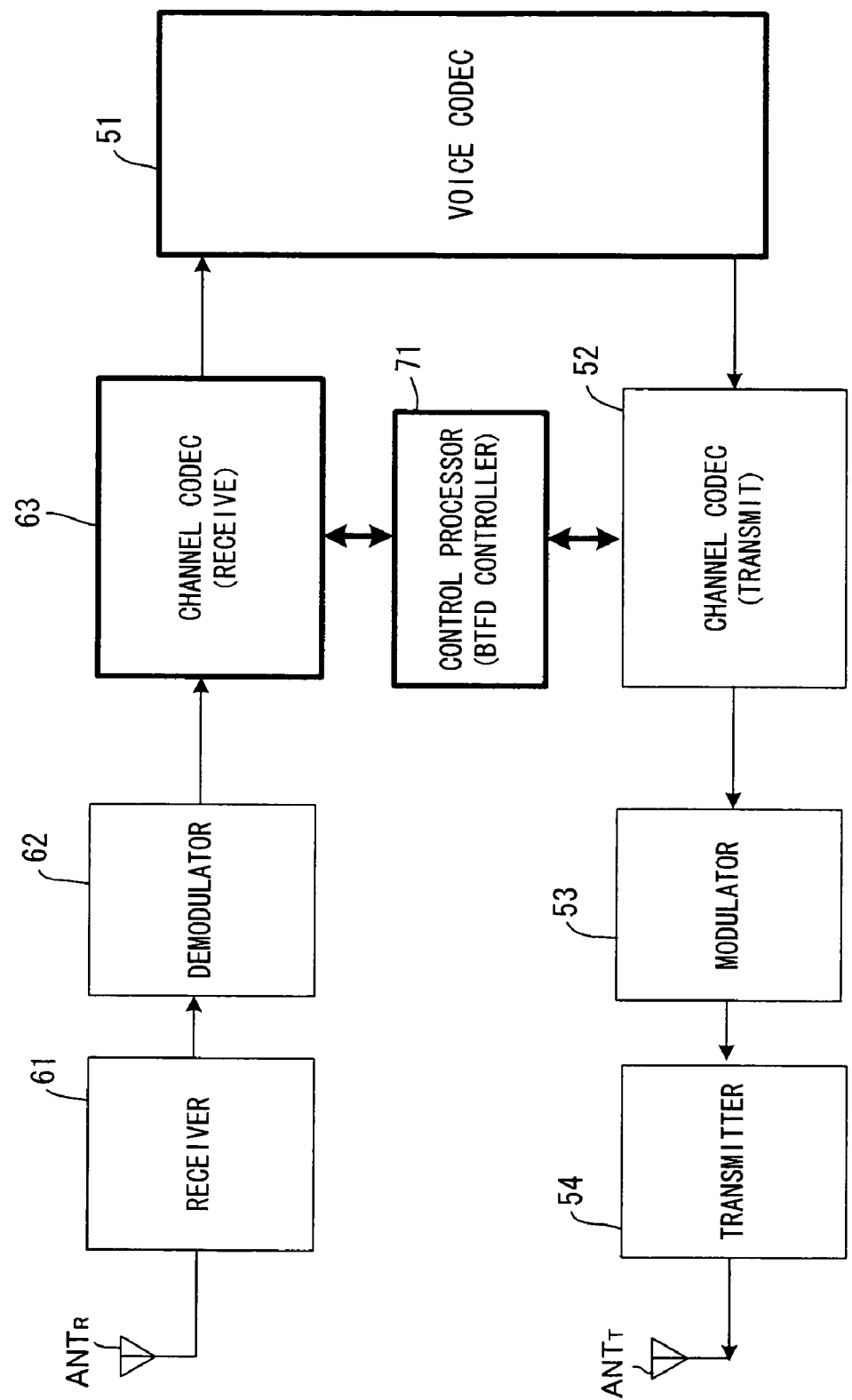
FIG. 1 is a block diagram of a mobile terminal in a W-CDMA system according to the present invention.

FIG. 1 is a block diagram of a mobile terminal in a W-CDMA system according to the present invention. The mobile terminal includes a voice codec 51 for encoding an input voice signal and for restoring voice code to a voice signal and outputting the voice signal; a transmit-side channel codec 52 for subjecting voice code to error-correction encoding processing (channel encoding processing) and outputting the resultant signal; a modulator 53 for spreading and modulating transmit data; a transmitter 54 for converting a spread-modulated baseband signal to a high-frequency signal and transmitting the signal from a transmitting antenna $ANT_T$; a receiver 61 for demodulating, to a baseband signal, a receive signal received from a receiving antenna $ANT_R$; a demodulator 62 for despreading the baseband signal; a receive-side channel codec 63 for subjecting the despread receive data to error-correction decoding processing (channel decoding processing) and inputting the decoded voice code to the voice codec 51; and a control processor (BTFD controller) 71 for performing BTFD control.

The voice codec 51 encodes a voice signal every TTI of 20 ms by an AMR voice encoding scheme, divides the voice code obtained into three classes, namely Classes A to C, expresses each class by a bit length that conforms to a prescribed bit rate, and inputs the voice code of each class to the transmit-side channel codec 52 in such a manner that the codes will be transmitted on three transport channels TrCH. When a call is connected, a base station reports a plurality of bit-rate combination candidates (see FIG. 10) of the Classes A to C to the originating terminal and terminating terminal and instructs at which bit-rate combination voice code should be transmitted. The voice codec 51 expresses voice codes by numbers of bits conforming to the bit rates of each of the classes in the specified combination and inputs the voice code to the channel codec 52.

The transmit-side channel codec 52 on the transmitting side attaches a CRC check code of fixed length to the voice code of Class A, subjects the TTI=20 ms voice code of each of the classes A to C to Viterbi encoding processing to encode the same, divides the encoded data into frame units (units of 10 ms) after rate matching is performed, multiplexes the voice code data of each class that has undergone error-correction encoding, with the data of Class A being brought to the forefront, every 10 ms and transmits the multiplexed data via the modulator 53 and transmitter 54.

The receive-side channel codec 63 demultiplexes, frame by frame (every 10 ms), data of Classes A to C at prescribed intervals from the multiplexed data that enters via the receiver 61 and demodulator 62, joins two items of 10-ms receive data of each class to form data having a transmission time interval TTI of 20 ms, subsequently subjects the data of Classes A to C to error-correction decoding processing to decode the original voice code data of classes A to C, and inputs the decoded data to the voice codec 51. At this time it is necessary that the receive-side channel codec 63 demultiplex the voice code data of the prescribed bit length of each class correctly and input the data to the voice codec. To accomplish this, the BTFD controller 71 identifies the bit length of the voice code data of each class by BTFD processing, and the receive-side channel codec 63 cuts the voice code data of each class of the identified bit length from the results of decoding and inputs this data to the voice codec 51. In BTFD processing, the receive-side channel codec 63 applies the decoded data of Class A to a CRC check operation, and the BTFD controller 71 identifies the bit length of the voice code of each class based upon the result of the CRC check.

(B) Processing by Transmit-Side/Receive-Side Channel Codecs

Figure 2:
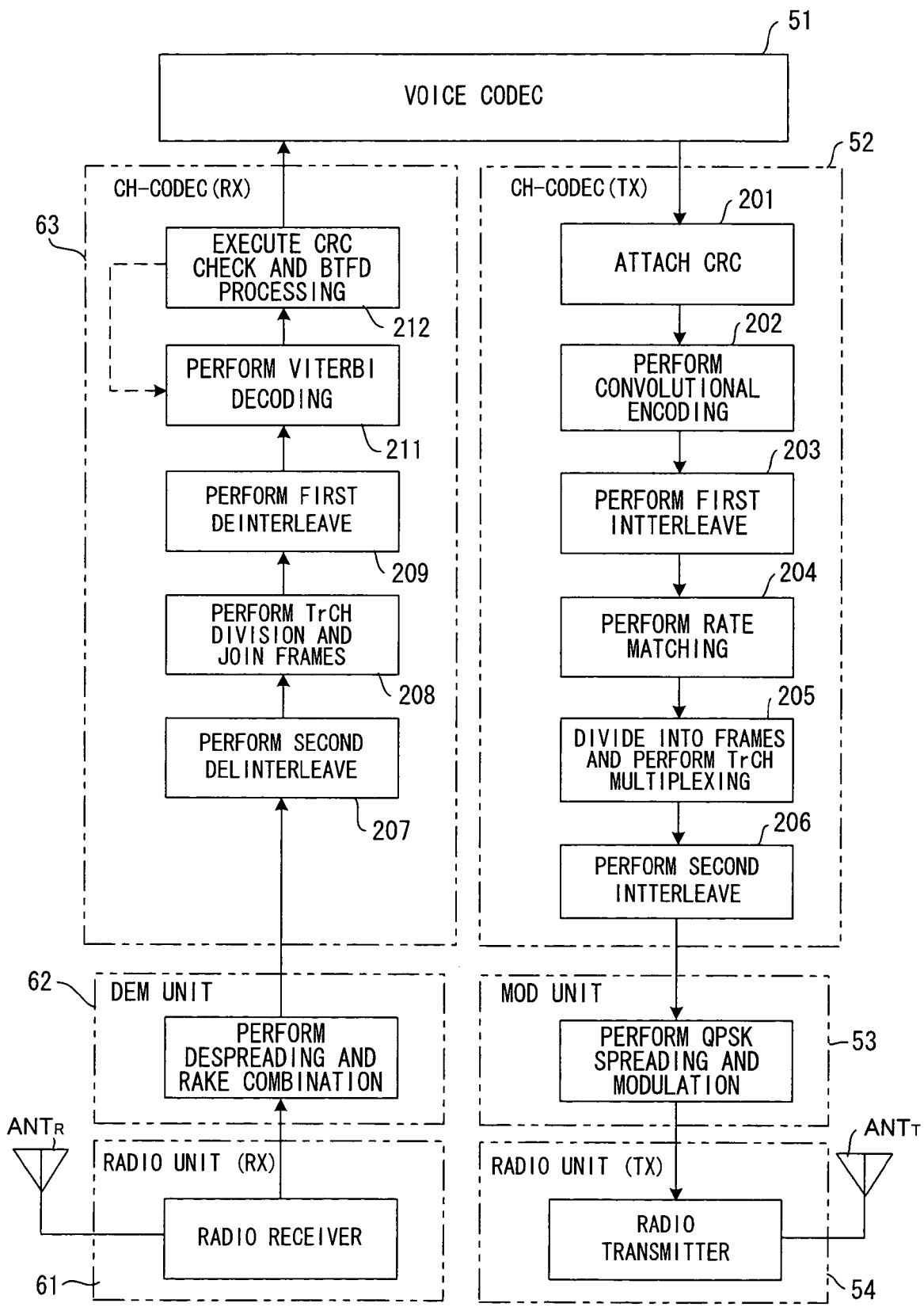
FIG. 2 is a diagram useful in describing processing by a channel codec on a transmitting side and a channel codec on a receiving side.
Figure 12:
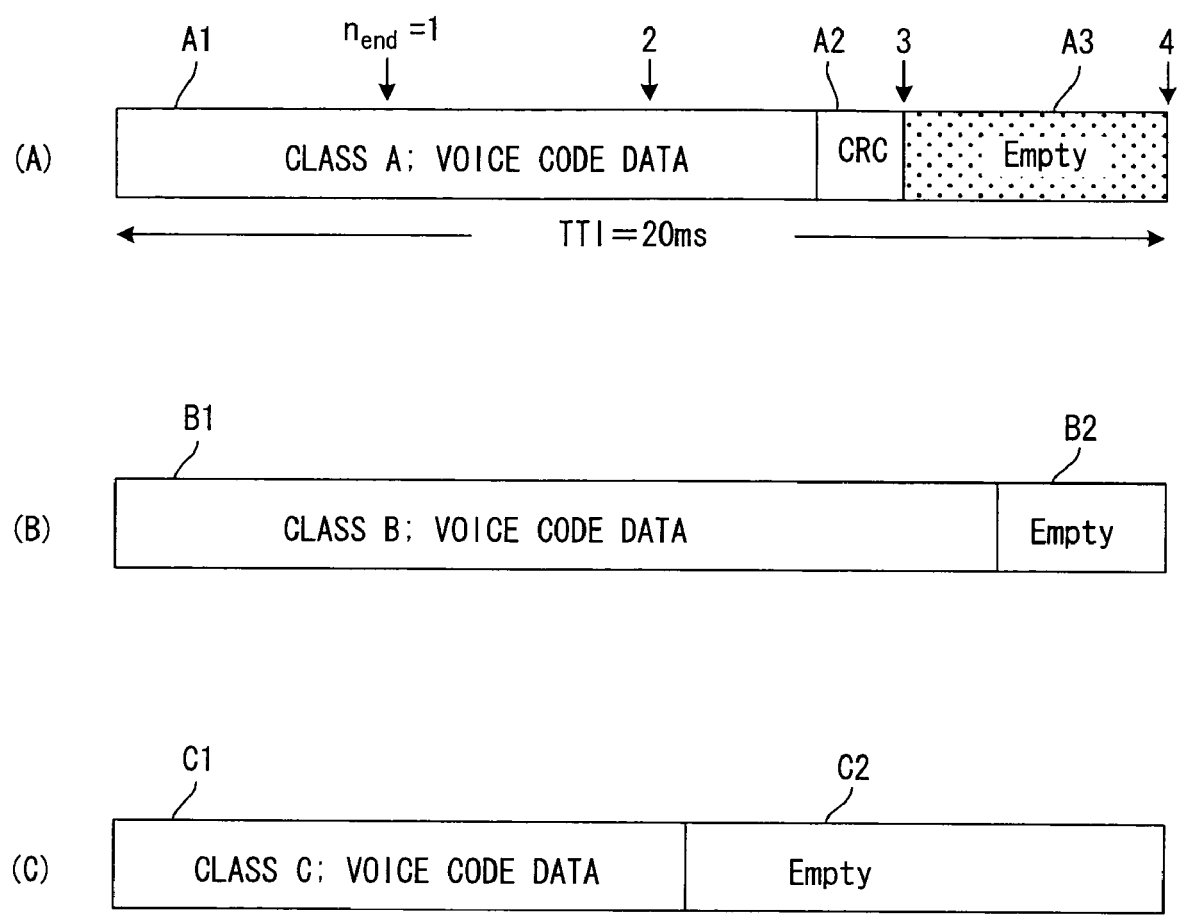
FIG. 12 shows the data structure of each TTI=20 ms class after decoding processing.
Figure 16:
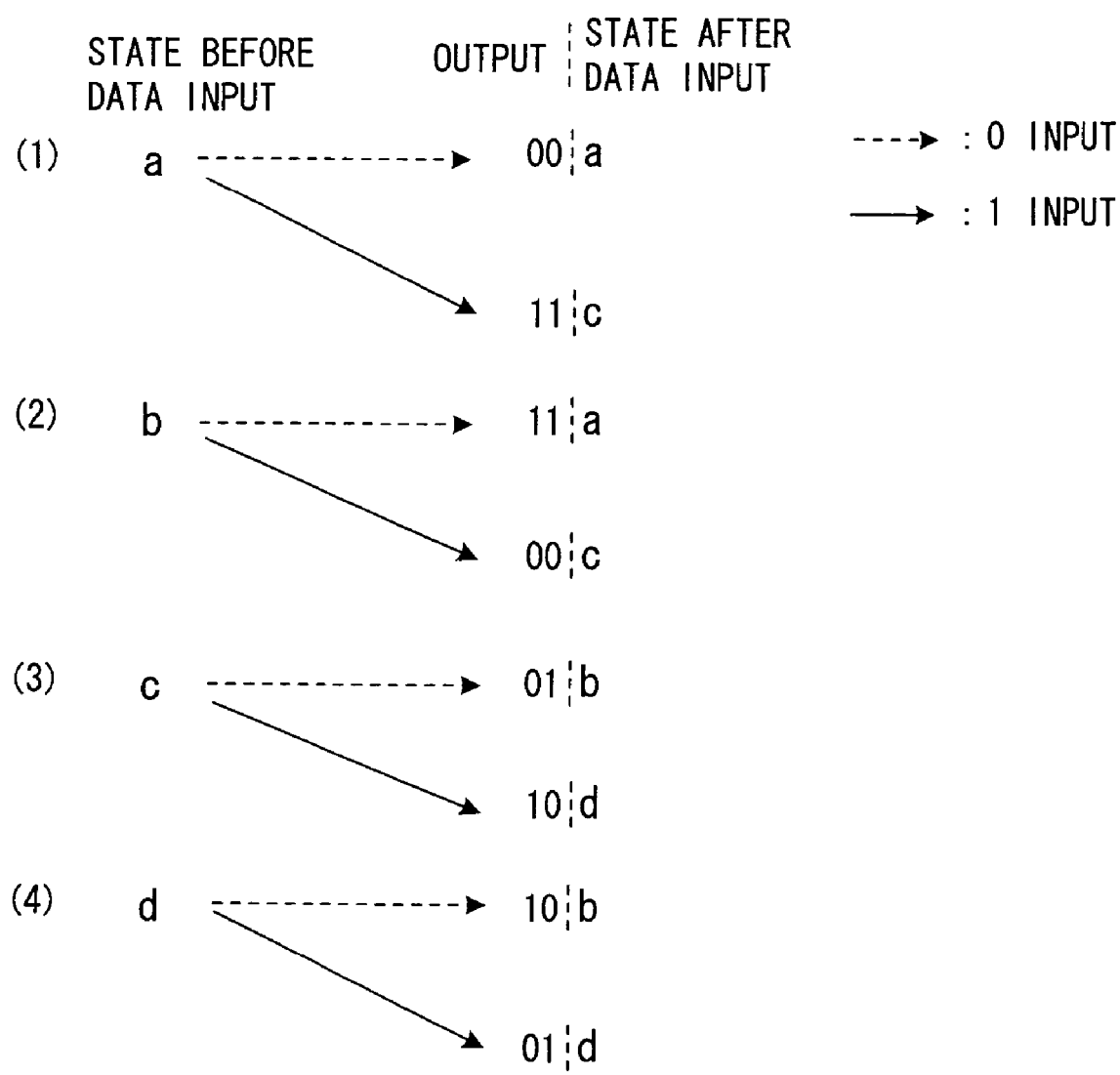
FIG. 16 is a diagram showing the relationship between the states and input/output of a convolutional encoder.
Figure 17:
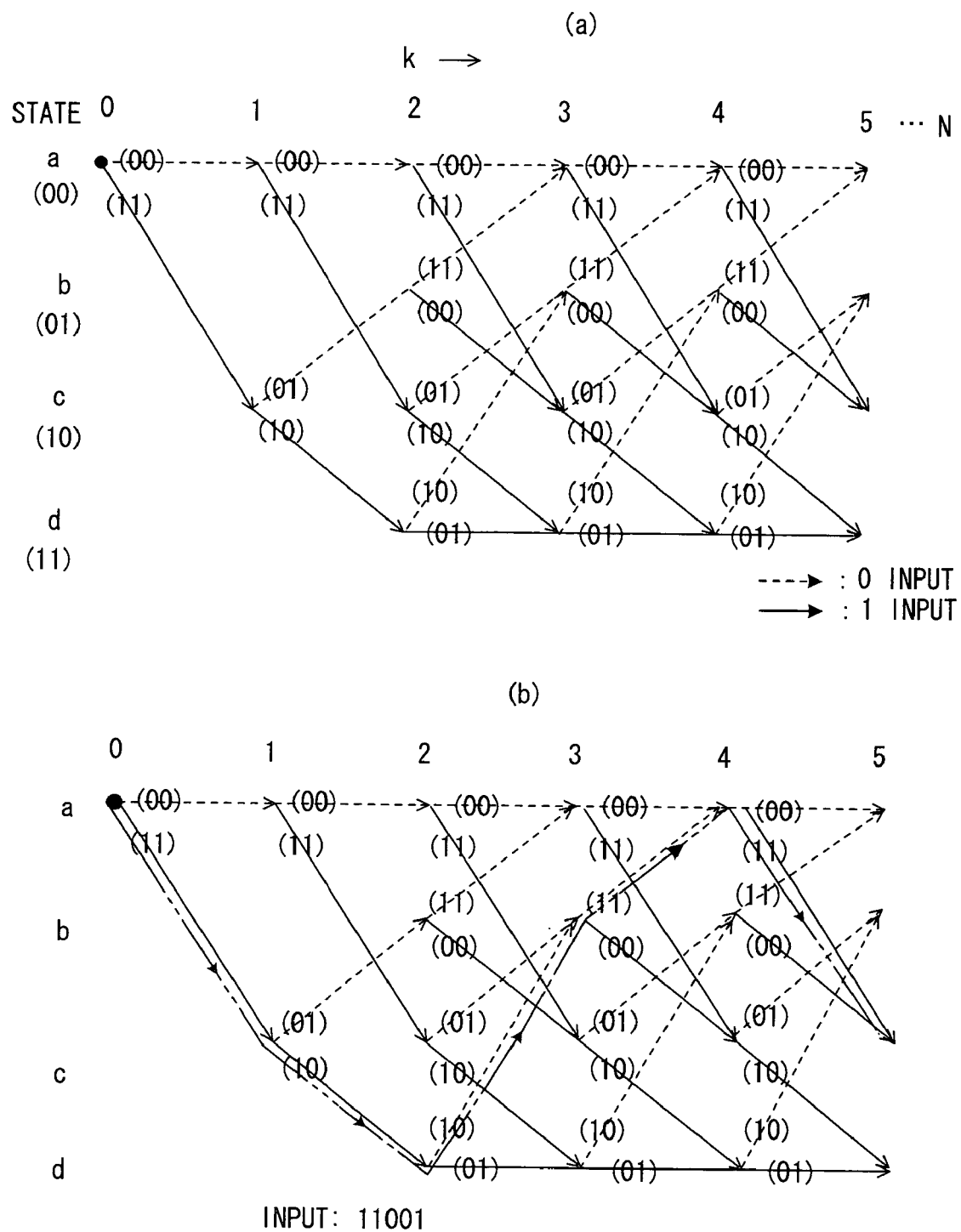
FIG. 17 is a diagram useful in describing a lattice-like representation.
Figure 18:
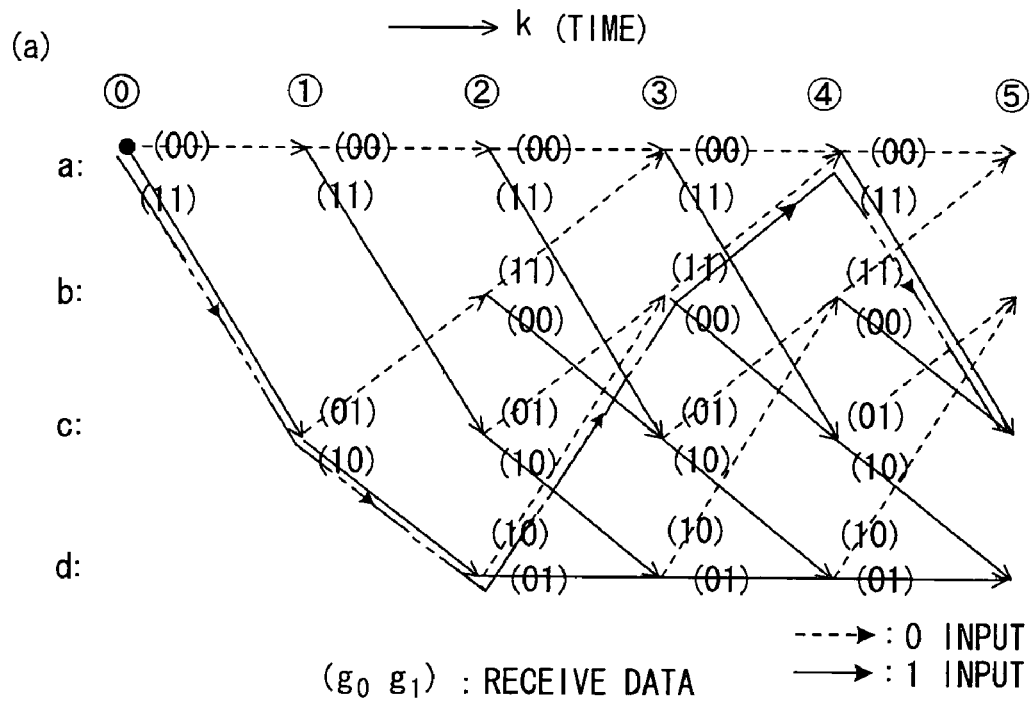
FIG. 18 is a diagram useful in describing decoded of convolutional code.
Figure 19:
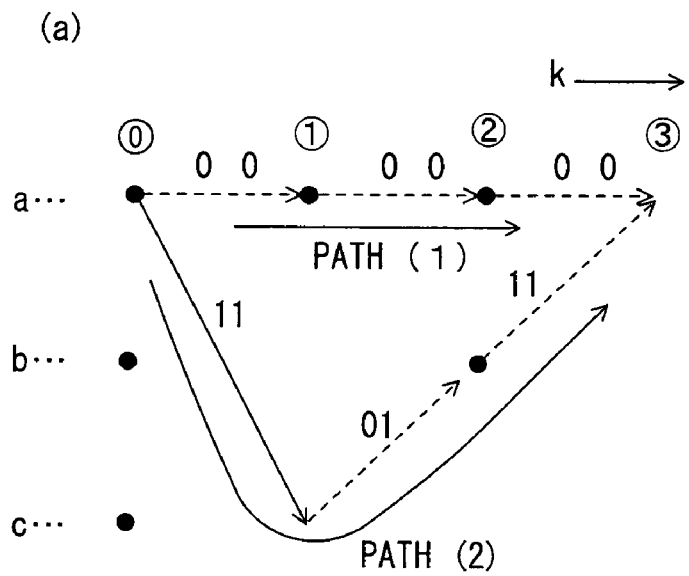
FIG. 19 is a diagram useful in describing Viterbi decoding.
Figure 20:
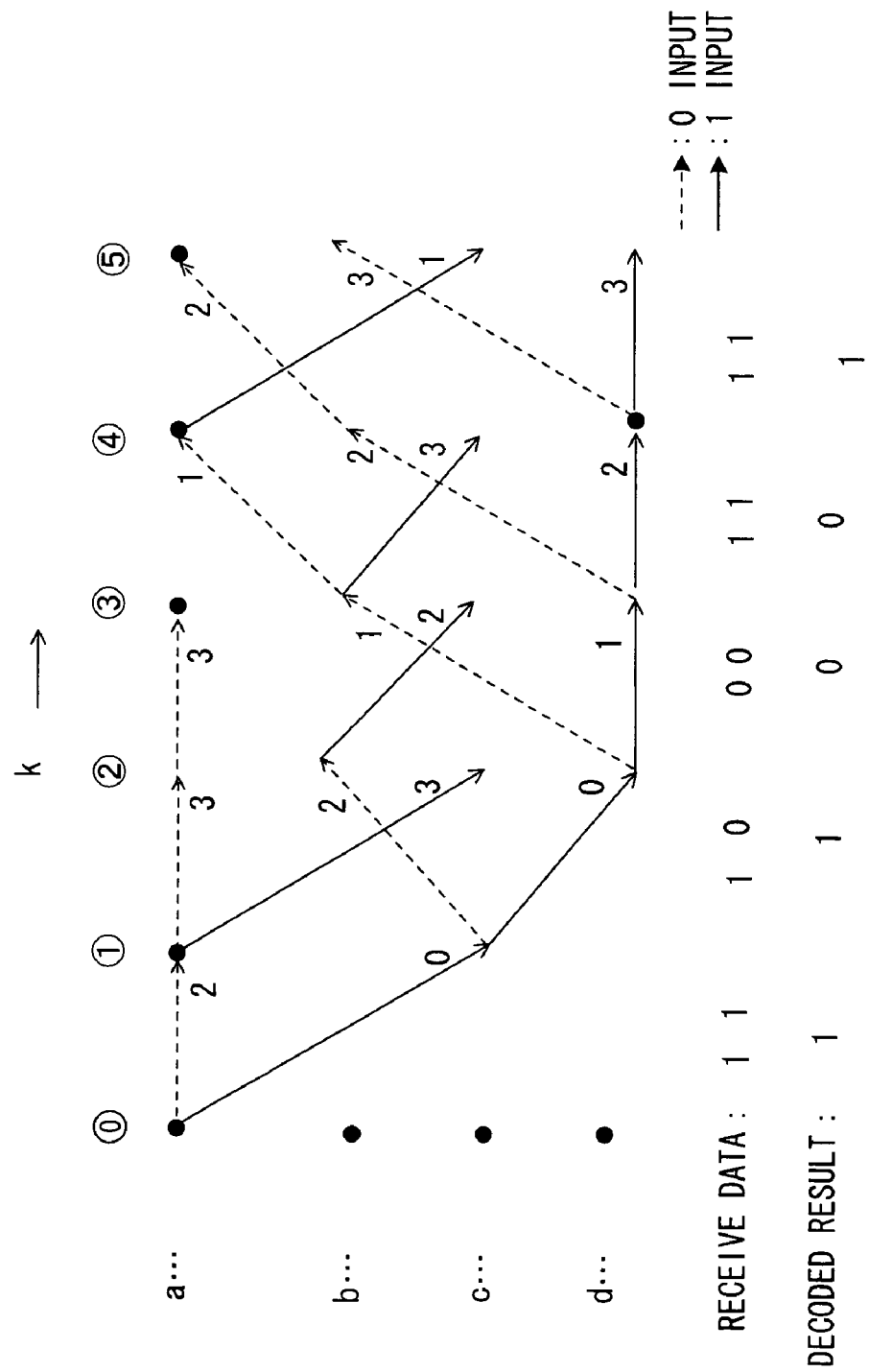
FIG. 20 is a diagram useful in describing a minimum error path of each state at any time k.
Figure 21:
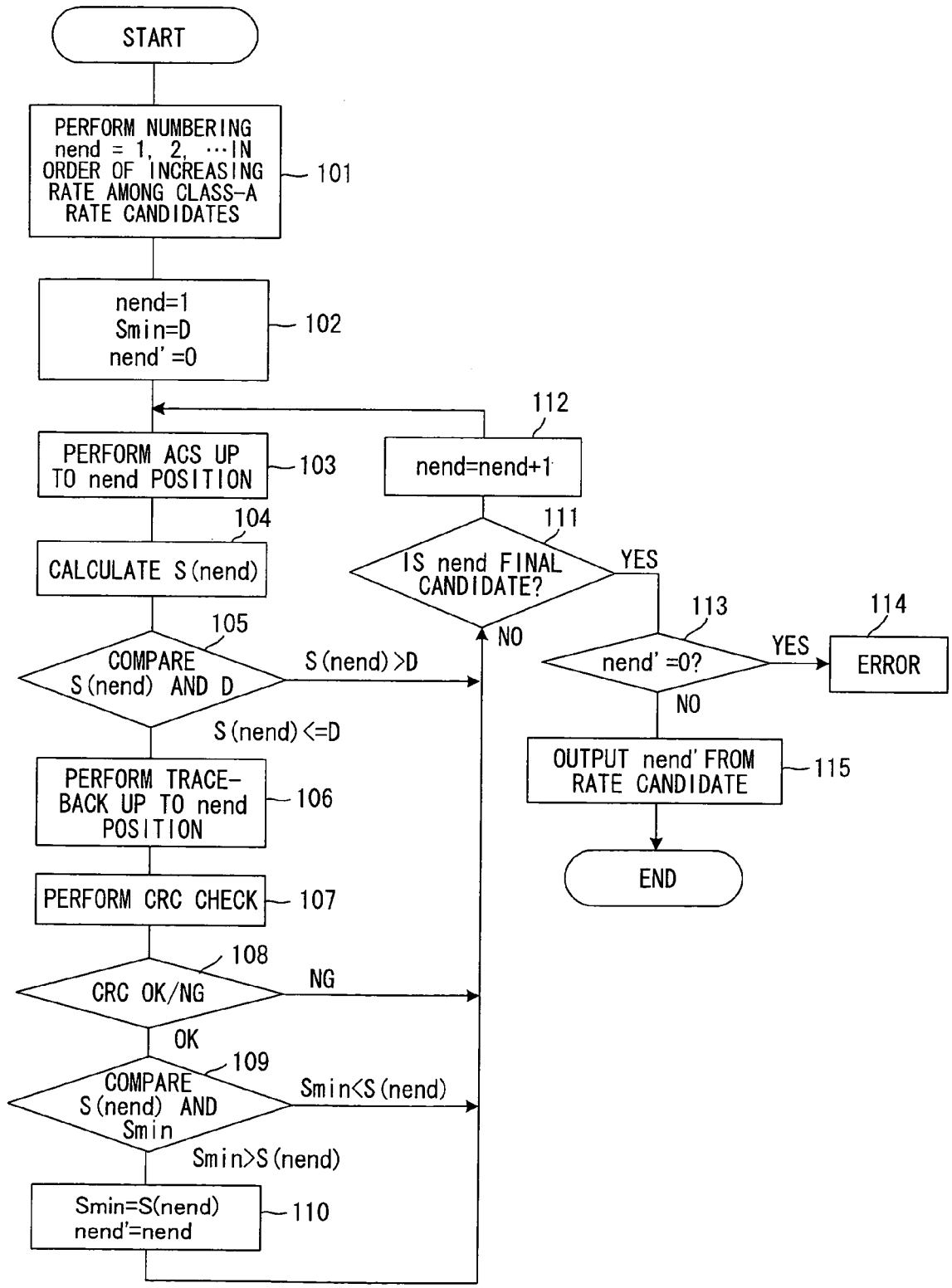
FIG. 21 is a flowchart of BTFD processing according to the prior art.
Figure 22:
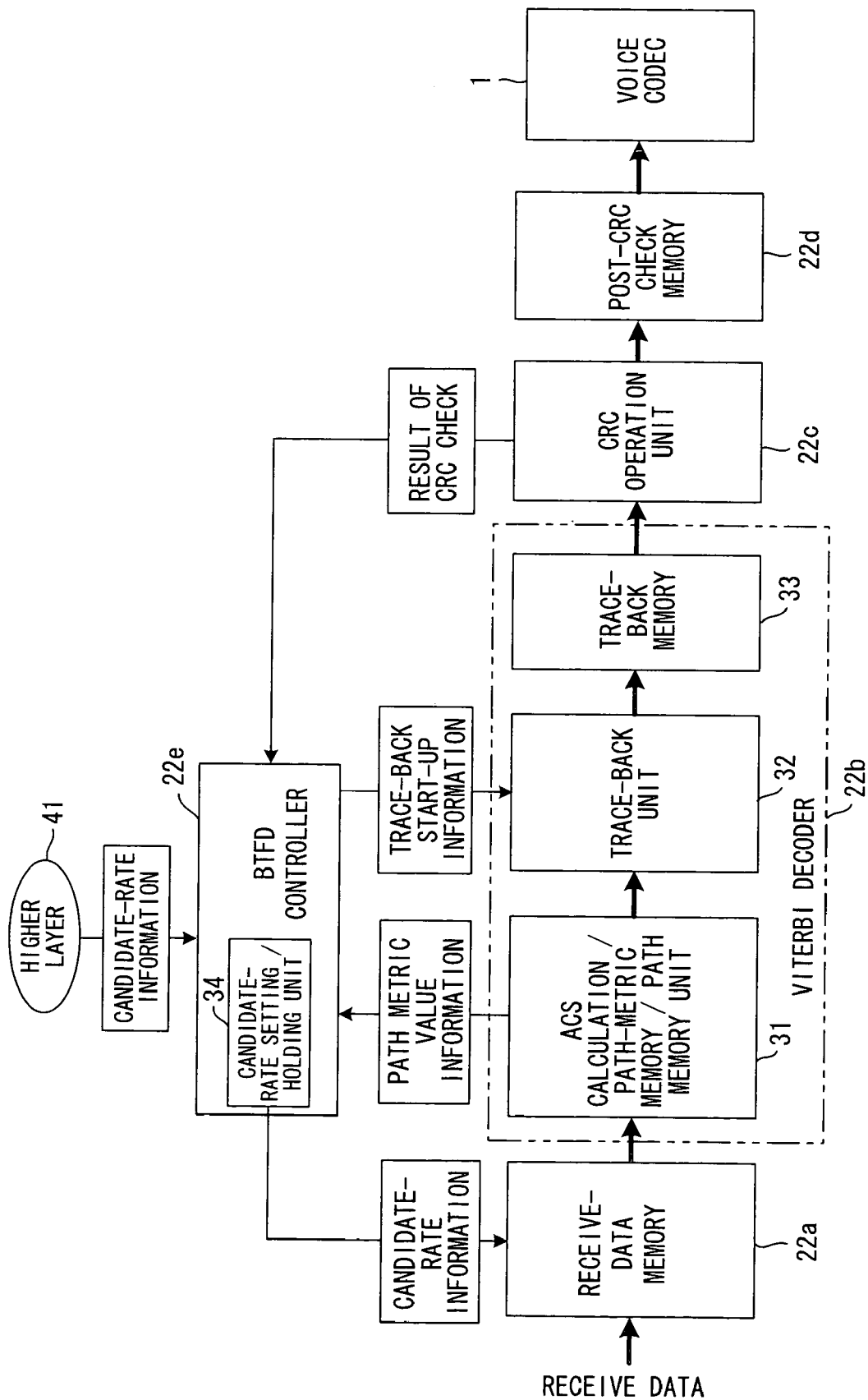
FIG. 22 is a block diagram of a conventional channel codec on the receiving side for executing BTFD processing.

FIG. 2 is a diagram useful in describing processing by the transmit-side channel codec 52 and receive-side channel codec 63. The voice code data of each of the Classes A to C from the voice codec 51 is input to the transmit-side channel codec 52. The latter attaches a CRC code bit to the voice code data of Class A (step 201) and then applies Viterbi encoding processing to the voice code data of each class (step 202). The transmit-side channel codec 52 thenceforth subjects the encoded data of each class to first interleave processing (step 203) and then performs a rate matching operation (an operation for elongating or shortening data so as to fall within the allowable rate of each TrCH) (step 204). The transmit-side channel codec 52 divides, every 10 ms, the encoded data of each class that has undergone rate matching and multiplexes the encoded data of each class every 10 ms in such an order that the data of Class A will be brought to the forefront (step 205). The transmit-side channel codec subjects this multiplexed data to second interleave processing (step 206) and inputs the results to the modulator (MO unit) 53. The modulator 53 performs QPSK spreading and QPSK modulation, and the transmitter 54 effects a conversion to an RF signal and transmits the signal from the antenna. It should be noted that the rate data elongation/shortening in rate matching is limited. In a case where the rate does not fall within the allowable rate, prescribed data is inserted into this portion and no transmission is made in the interval in which the data has been inserted. This corresponds to the empty interval A3 in FIG. 12.

At the time of reception, the receiver 61 effects a conversion from an RF signal to a baseband signal, and the demodulator (DEM unit) 62 performs QPSK demodulation and QPSK despreading/RAKE combination, thereby demodulating the receive data, and inputs the received data to the receive-side channel codec 63. The latter subjects the multiplexed data received to second deinterleave processing (step 207) and then generates TTI=20 ms data by joining, class by class, 10-ms data that is the result of demultiplexing into Classes A to C multiplexed data that has been received every item of 10-ms data (step 208). The receive-side channel codec 63 thenceforth applies first deinterleave processing to the receive data class by class (step 209) and performs decoding by applying Viterbi decoding processing (step 211). After decoding, the receive-side channel codec subjects the decoded data of Class A to CRC check processing and, in accordance with BTFD control, identifies the bit length of the voice code data of each class based upon the results of the CRC check (step 212) and inputs the voice code of each class to the voice codec 51 based upon the bit lengths.

(C) Data Format and Multiplexing/Demultiplexing of Each Class

Figure 3:
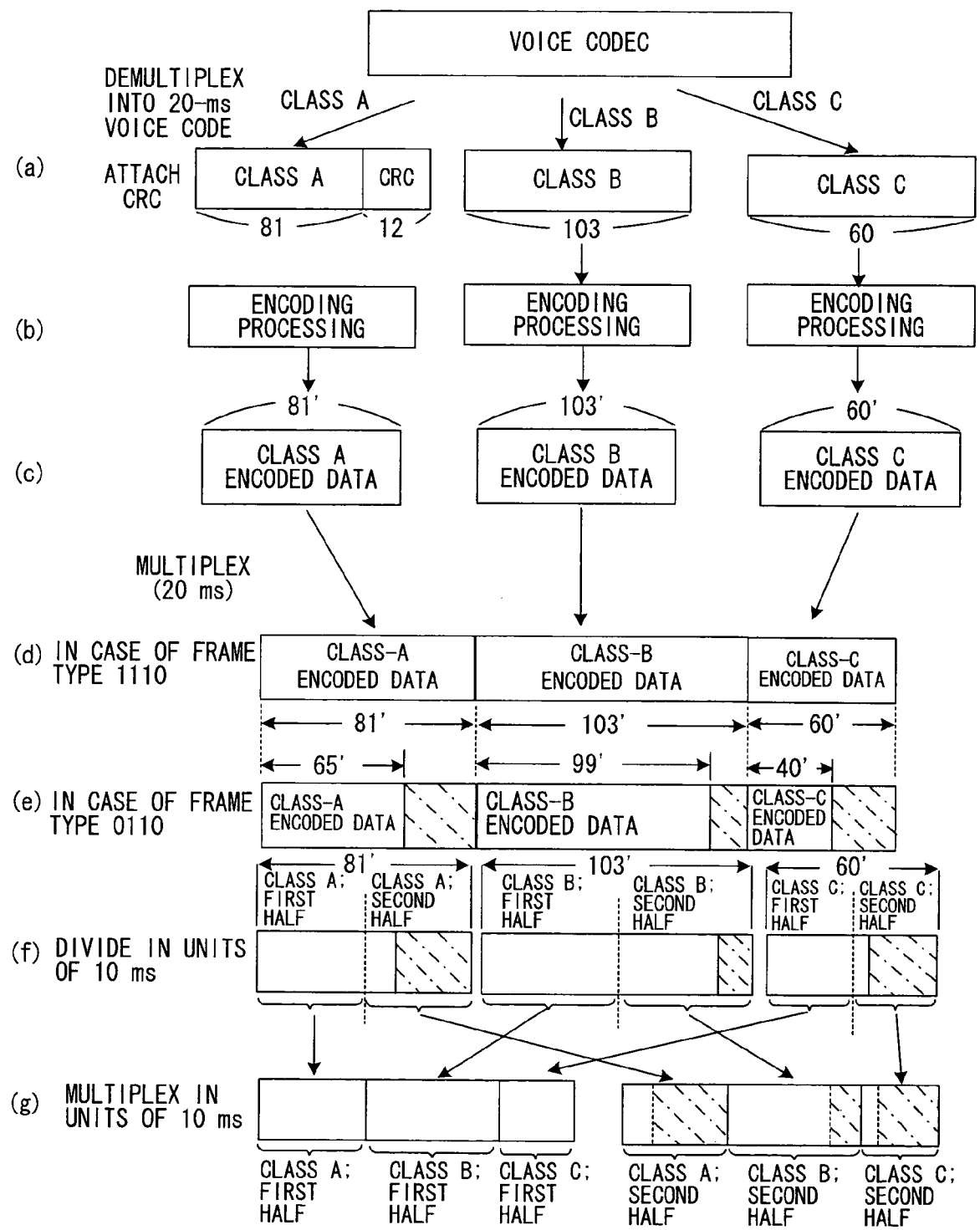
FIG. 3 is a diagram useful in describing the data format of each class and the structure of multiplexed data in the channel codec on the transmitting side.

FIG. 3 is a diagram useful in describing the data format of each class and the structure of multiplexed data in the channel codec on the transmitting side. The voice codec 51 encodes the voice signal every TTI of 20 ms by AMR voice encoding, divides the obtained voice code into the three classes A to C, expresses the classes by respective ones of prescribed bit rates, e.g., bit lengths (Class A: 81 bits, Class B: 103 bits, Class C: 60 bits) conforming to frame type 1110 of the maximum rate shown in FIG. 10, and inputs the voice code of each class to the transmit-side channel codec 52 [see (a)].

The transmit-side channel codec 52 attaches a CRC check code of fixed length, e.g., 12 bits, to the voice code of Class A [(a)] and then applies Viterbi encoding processing, interleave processing and rate matching processing to the voice code of each class of TTI=20 ms, thereby generating encoded data [see (b), (c)]. The bit lengths of the classes are enlarged to 81', 103', 60' by convolutional encoding processing and rate matching processing. If n represents the encoding rate of convolutional code, the length of the encoded data of each class becomes a length that is n times the original length+α (where α is the amount of increase or decrease due to rate matching).

The TTI=20 ms encoded data of each class actually is divided every 10 ms and multiplexed every 10 ms with the data of Class A being brought to the forefront. However, if the encoded data is data that is not divided, then the encoded data of each class is multiplexed without gaps, as indicated at (d). That is, in a case where the voice code of each class is expressed by the number of bits that conforms to the combination candidate of the maximum rate, the encoded data of each class is multiplexed without gaps. It should be noted that the encoded-data lengths 81', 103', 60' of the classes in the combination candidate of maximum rate are already known values. In a case where the voice codes of the classes are expressed by bit counts conforming to a combination candidate other than that of the maximum rate, e.g., bit counts (Class A: 65 bits, Class B: 99 bits, Class C: 400 bits) conforming to the combination of frame type 0110, the encoded-data lengths 65', 99', 40' of the classes will be less than the maximum encoded-data lengths 81', 103', 60'. In such case data indicating non-transmit intervals equivalent to the shortfall are inserted, as indicated by the hatching at (e). By adopting this arrangement, the data of each class can be demultiplexed easily on the receiving side. In actuality, as mentioned above, the TTI=20 ms encoded data of each class is divided into first and second halves every 10 ms and is multiplexed every 10 ms with the data of Class A being brought to the forefront. Accordingly, in the case of the combination of frame type 0110 indicated at (e), the encoded-data of each of Classes A to C is divided into first and second halves of 10 ms each, as indicated at (f), and is transmitted upon being multiplexed every 10 ms with the data of Class A being brought to the forefront, as indicated at (g).

Figure 4:
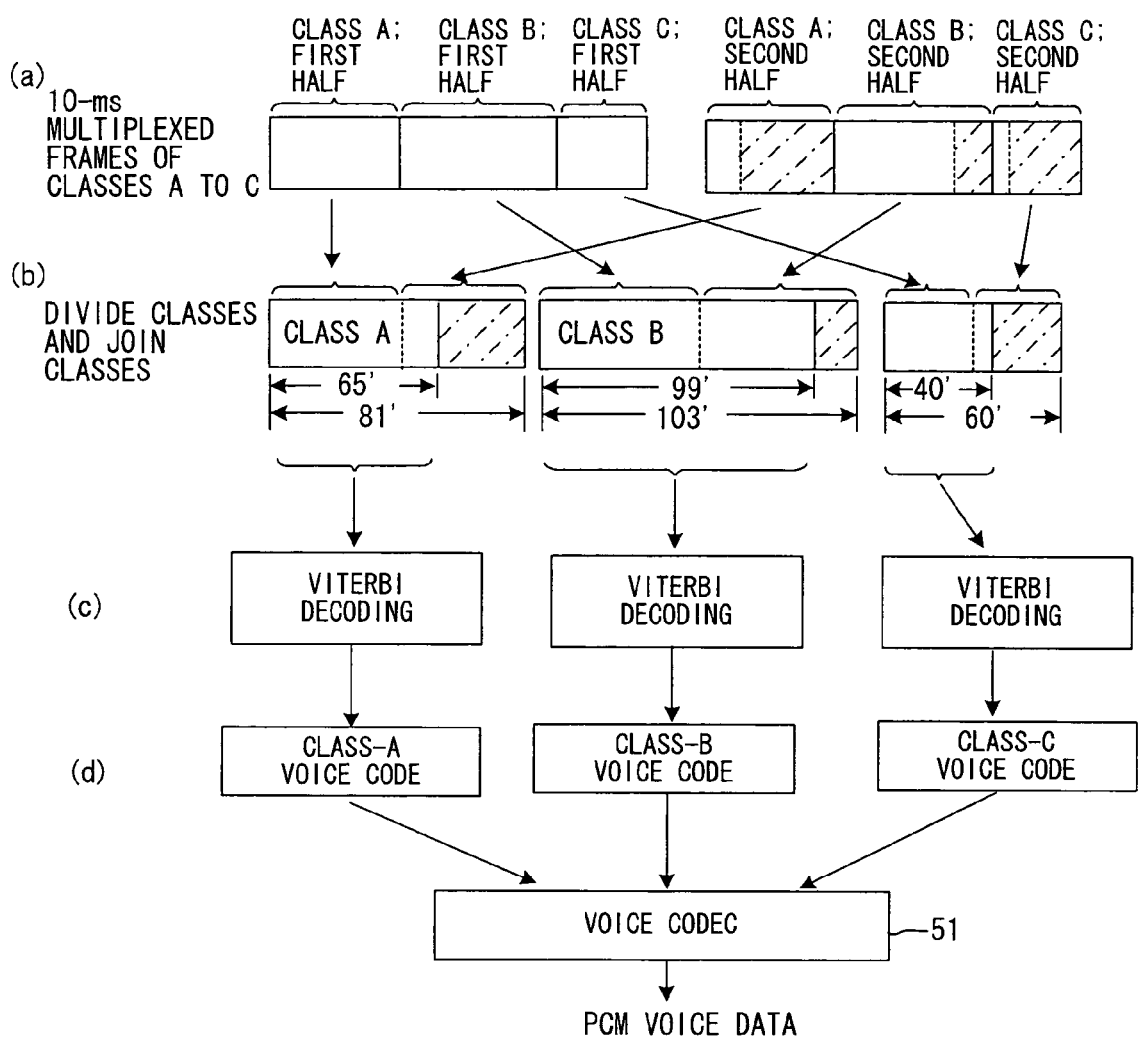
FIG. 4 is a diagram useful in describing a voice-code demultiplexing operation of each class in the channel codec on the receiving side.

FIG. 4 is a diagram useful in describing a voice-code demultiplexing operation of each class in the channel codec on the receiving side. The receive-side channel codec 63 demultiplexes, at known prescribed lengths, data of Classes A to C every 10 ms from multiplexed data [see (a)] that enters via the receiver 61 and demodulator 62, and joins two items of 10-ms receive data of each class to thereby generate data having a transmission time interval TTI of 20 ms, as indicated at (b). The receive-side channel codec 63 subsequently subjects the data of Classes A to C to Viterbi decoding processing to decode the original voice code data of classes A to C, and inputs the decoded data to the voice codec 51 [see (c), (d)]. At this time the bit lengths of the voice code data of each of the classes are identified by BTFD processing, voice code data of each class from which the data portions due to noise or the like (the hatched portions) have been removed is extracted from the decoded results based upon the identified bit lengths, and the extracted data is input to the voice codec 51.

(D) Structure of Receive-Side Channel Codec That Executes BTFD Processing

Figure 5:
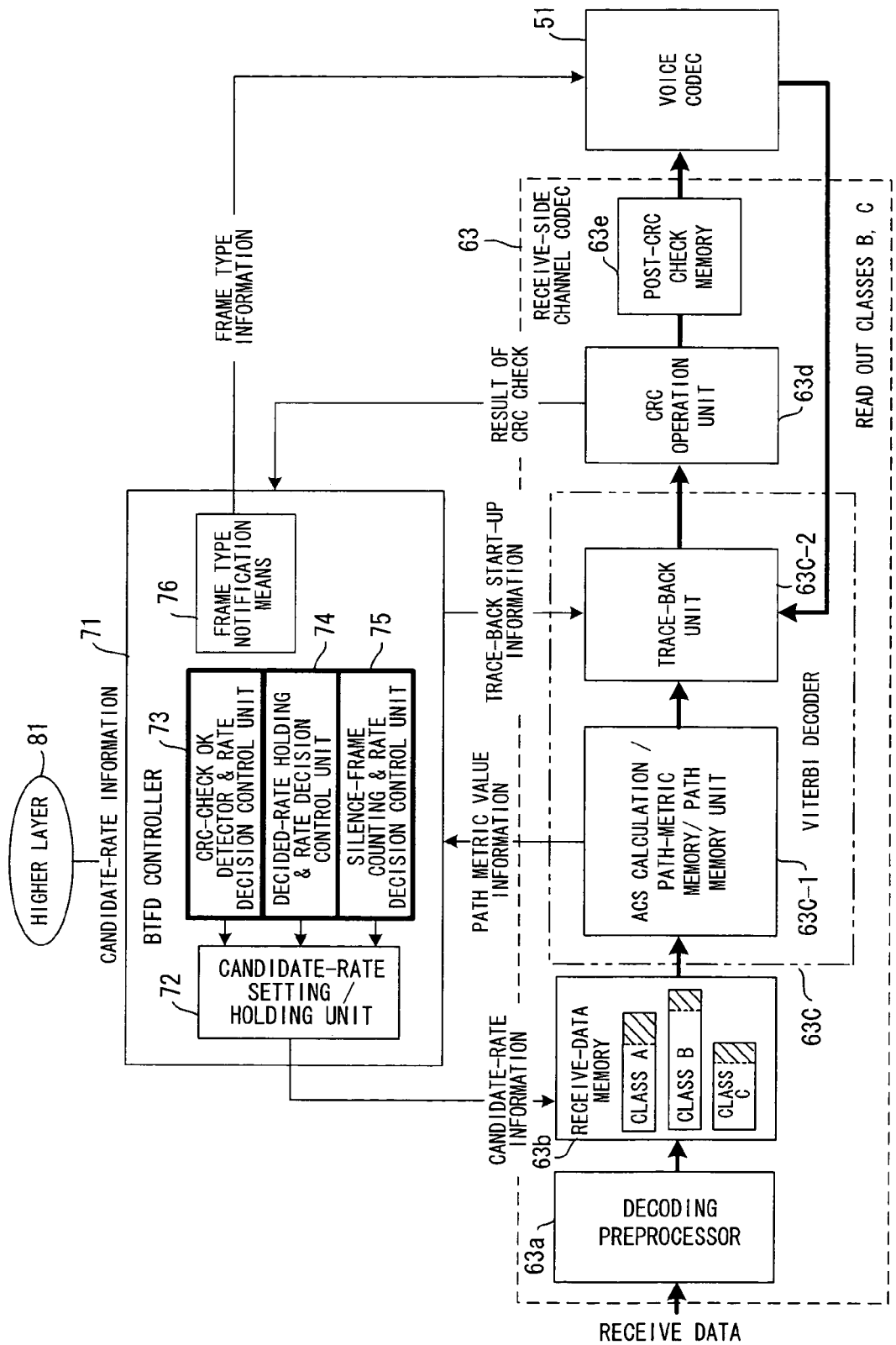
FIG. 5 is a block diagram of the channel codec and a BTFD controller on the receiving side for executing BTFD processing according to the present invention.

FIG. 5 is a block diagram of the channel codec and a BTFD controller on the receiving side for executing BTFD processing according to the present invention.

A decoding preprocessor 63*a* of the receive-side channel codec 63 executes the second interleave processing 207, the class-by-class dividing and joining processing 208 and first deinterleave processing 209 described in FIG. 2. A receive-data memory 63*b* stores the TTI=20 ms data of each class that is output from the decoding preprocessor 63*a*. In this case, the receive-data memory 63*b* stores TTI=20 ms data of each class in a state in which padding data has been filled into the portions (hatched portions) that fall short of the known encoded-data lengths conforming to the maximum rate, as indicated in FIG. 4(*b*).

A Viterbi decoder 63*c* includes an ACS operation/path-metric memory/path memory unit 63*c*-1, a trace-back unit 63*c*-2 and a post-trace-back memory 63*c*-3. The Viterbi decoder 63*c* applies Viterbi decoding processing to the data portion that extends up to the $n_{end}$ position with regard to Class A, applies Viterbi decoding processing to all data with regard to Classes B, C, and stores the path at each point in time in a path memory. That is, with regard to Classes B, C, the Viterbi decoder executes Viterbi decoding processing up to the tail-end position because the data lengths are not known, stores in the path memory, at each time k corresponding to each data-length candidate, four paths, for which the path metric values are smallest, leading to respective ones of the states a, b, c, d, and stores each of the path metric values in the path-metric memory.

A CRC operation unit 63*d* performs a CRC check operation based upon the result of decoding Class A. A post-CRC check memory 63*e* stores decoded data (voice code) of Class A prevailing when the CRC check is OK and, moreover, Smin has been obtained in BTFD processing.

The BTFD controller 71, which executes BTFD processing in accordance with a flowchart described later and decides the bit count of the voice code of each class, includes a candidate-rate setting/holding unit 72, a CRC-check OK detector & rate decision control unit 73, a determined-rate holding & rate decision control unit 74, a silence-frame counting & rate decision control unit 75, a frame type notification means 76.

The candidate-rate setting/holding unit 72 holds a plurality of bit-rate candidates (see FIG. 10) reported from a higher layer (host application) 81 and sets the bit rates of Class A in the receive-data memory 63b successively in order of increasing bit rate.

The CRC-check OK detector & rate decision control unit 73 changes the bit-rate combination candidates successively to thereby change over the bit lengths of Class A in order of increasing bit length, and decides the bit length of each class based upon the bit-rate combination candidate that prevails when an acceptable CRC check is detected.

When an acceptable CRC check has been detected and the bit rate of each class has been definitely determined, the determined-rate holding & rate decision control unit 74 holds the bit-rate combination candidate prevailing at this time for the length of one transmission time interval TTI and, in succeeding bit-rate decision processing following elapse of the interval TTI, starts BTFD processing at the bit rate of Class A in the bit-rate combination candidate that has been stored and decides the bit length of each class.

If silence frames have been detected, the silence-frame counting & rate decision control unit 75 counts the number of consecutive silence frames and, if these frames have been counted seven times in succession, starts BTFD processing at the bit rate of Class A of the bit-rate combination candidate that conforms to the background noise and decides the bit length of each class.

When the bit rate of each class has been decided by BTFD processing, the frame type notification means 76 notifies the voice codec 51 of frame type information that specifies the bit-rate combination candidate prevailing at this time. As a result, the voice codec 51 inputs the frame type information, i.e., the bit length of each class, to the trace-back unit 63c-2 and starts up the trace-back unit. The trace-back unit 63c-2 obtains, from the path memory, the path for which the path metric value is smallest from among the four paths at time k corresponding to the bit lengths of Classes B, C, executes trace-back processing along this path, acquires the voice codes of Classes B, C and stores them in the post-CRC check memory 22d via the CRC operation unit 22c. When the voice codes of Classes A, B, C have been obtained in the post-CRC check memory 22d, the voice codec 51 loads these voice codes and restores the voice signal from the voice codes.

(E) First Embodiment of BTFD Processing According to the Present Invention

Figure 6:
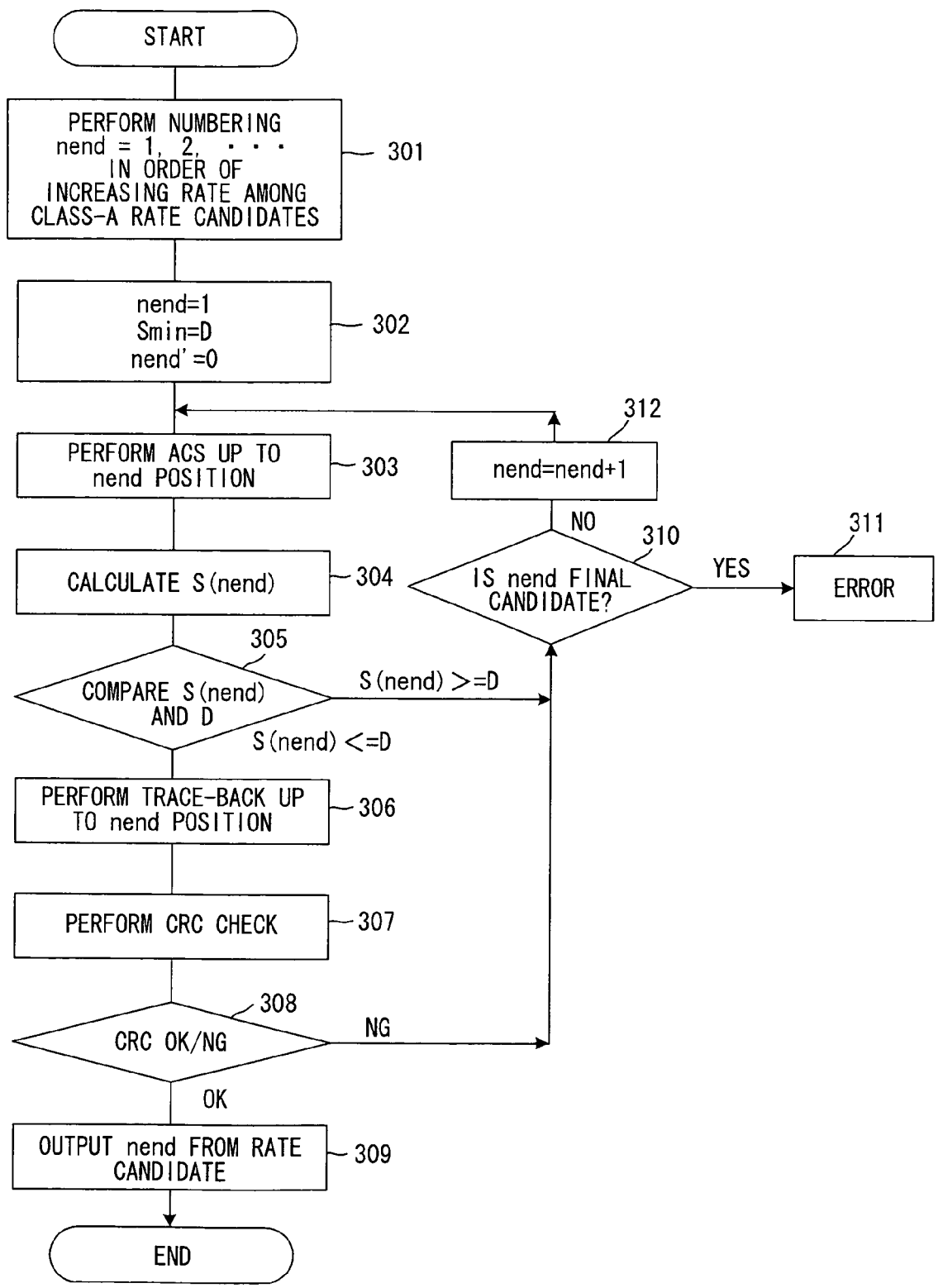
FIG. 6 is a flowchart of BTFD processing according to a first embodiment of the present invention.

FIG. 6 is a flowchart of BTFD processing according to a first embodiment of the present invention. According to BTFD processing according to the first embodiment, when it is detected that a CRC check is acceptable, the BTFD processing is halted from this moment onward, the number of bits of voice code of each class is decided based upon the bit rate of each class in a bit-rate combination that prevails when the CRC check is acceptable, the voice code of each class is extracted from receive data based upon the number of bits and the voice code is input to a voice codec.

Since bit-rate candidates (FIG. 10) are specified from within a host application 81, the BTFD controller 71 assigns numbers in order of increasing bit rate (number of bits per unit time) of Class A in the manner $n_{end}$=1, 2, 3, . . . (step 301). Next, initialization is performed as follows: $n_{end}$=1, $S_{min}$=D, $n_{end}'$=0 (step 302).

Thereafter, the BTFD controller executes ACS processing up to the $n_{end}$ position (step 303) and calculates $S(n_{end})$ in accordance with Equation (1) (step 304). If $S(n_{end})$ has been obtained, then the BTFD controller compares this $S(n_{end})$ and the threshold value D (step 305).

If $S(n_{end}) \leq D$ holds, then the BTFD controller executes trace-back processing from the state in which the path metric value at the $n_{end}$ position is smallest (step 306). A CRC check is applied to the decoded data obtained by trace-back processing (step 307). If the CRC check is acceptable (step S308), then the BTFD controller judges that $n_{end}$ prevailing at this time is the bit rate-(bit count) of Class A in the bit-rate combination that is most reliable (step 309). This is followed by referring to the bit-rate combination candidates of FIG. 10 to find the bit rates (numbers of bits) of the other classes.

If $S(n_{end}) > D$ is found to hold at step 305, or if a "NO" decision is rendered by the CRC check at step 308, then the processing of step 310 is executed. It is determined at step S310 whether the above-described processing has been applied $n_{end}$ of all candidates.

If the above processing has been applied to $n_{end}$ of all candidates without an acceptable CRC check being obtained, a "YES" decision is rendered at step 310 and an error is output (step 311). However, if the above processing has not been completed with regard to $n_{end}$ of all candidates, then $n_{end}$ is incremented (step 312) and the processing of step 303 is repeated.

Receive processing will be described taking the above BTFD processing into consideration.

The higher layer (host application) 81 reports a plurality of bit-rate candidates (see FIG. 10) to the BTFD controller 71 in advance, and the candidate-rate setting/holding unit 72 holds the reported candidate rate information. Under these conditions, the receive-data memory 63b stores the TTI=20 ms data of each of the classes that have been separated and then joined. The candidate-rate setting/holding unit 72 of the BTFD controller 71 sets the bit rates of Class A, from among the plurality of candidate rates, in the receive-data memory 63b in order of increasing bit rate.

With regard to the received Class A, the receive-data memory 63b inputs the data to the ACS operation/path-metric memory/path memory unit 63c-1 of the Viterbi decoder in order in an amount equivalent to the number of bits that conforms to the set rate. The ACS operation/path-metric memory/path memory unit 63c-1 executes the ACS operation, holds the path metric values, which are the results of this operation, in an internal path-metric memory and reports the maximum path metric value $a_{max}(n_{end})$, the minimum path metric value $a_{min}(n_{end})$ and the path metric value $a_0(n_{end})$ of state a (state 0) to the BTFD controller 17.

The BTFD controller 71 calculates $S(n_{end})$ and compares $S(n_{end})$ and the threshold value D. If it is judged as a result that trace-back is to be performed, i.e., if $S(n_{end}) \leq D$ holds, then the BTFD controller 71 inputs trace-back start-up information to the trace-back unit 63c-2. In response, the trace-back unit 63c-2 stores decoded results up to the $n_{end}$ position in the trace-back unit 63c-2.

Thereafter, or before the Viterbi decoding of Class A, the receive-data memory 63b inputs the receive data of Classes B, C to the Viterbi decoder 63c, and the latter stores the results of decoding in the path memory. That is, with regard to Classes B, C, the Viterbi decoder 63c executes Viterbi decoding processing up to the tail-end position because the data lengths are not known, stores in the path memory, at each time k corresponding to each data-length candidate, four paths, for which the path metric values are smallest, leading to respective ones of the states a, b, c, d, and stores each of the path metric values in the path-metric memory.

If the decoding of Class A is finished, the trace-back unit 63c-2 inputs results of decoding in an amount equivalent to the number of bits (bit count $N_A$ of Class A+number of CRC check codes)) conforming to $n_{end}$ in the CRC operation unit 63d. The latter performs a CRC check operation and, if the CRC check is acceptable, stores decoded results from which CRC check code has been deleted in the post-CRC check memory 63e and recognizes that the bit count ($N_A$) of Class A conforming to the value of $n_{end}$ at this time is the true number of bits of the voice code of Class A.

Next, the BTFD controller 71 identifies a bit-rate combination candidate from the bit-rate combination candidate table (FIG. 10) and the number of bits of Class A and notifies the voice codec 51 of frame type information that specifies this bit-rate combination candidate. The voice codec 51 identifies the numbers of bits of voice code of each of the classes from the bit-rate combination candidate of which it has been notified, inputs these numbers of bits of voice code to the trace-back unit 63c-2 and starts up the trace-back unit 63c-2. The latter obtains, from the path memory, the path for which the path metric value is smallest from among four paths at time k corresponding to the bit lengths of Classes B, C, executes trace-back processing along this path, acquires the voice codes of Classes B, C and stores the voice code in the post-CRC check memory 22d via the CRC operation unit 22c. When the voice codes of Classes A, B, C have been obtained in the post-CRC check memory 22d, the voice codec 51 loads these voice codes and reconstructs the voice signal from the voice codes.

Thus, in accordance with the first embodiment, BTFD processing can be completed at the moment an acceptable CRC check is obtained, and therefore the amount of processing involved in BTFD processing can be reduced and, as a result, consumed current can be reduced. Moreover, despite these reductions, the number of bits of voice code of each class is identified and the voice codes of the respective classes can be separated correctly and input to the voice codec.

(E) Second Embodiment of BTFD Processing According to the Present Invention

Figure 7:
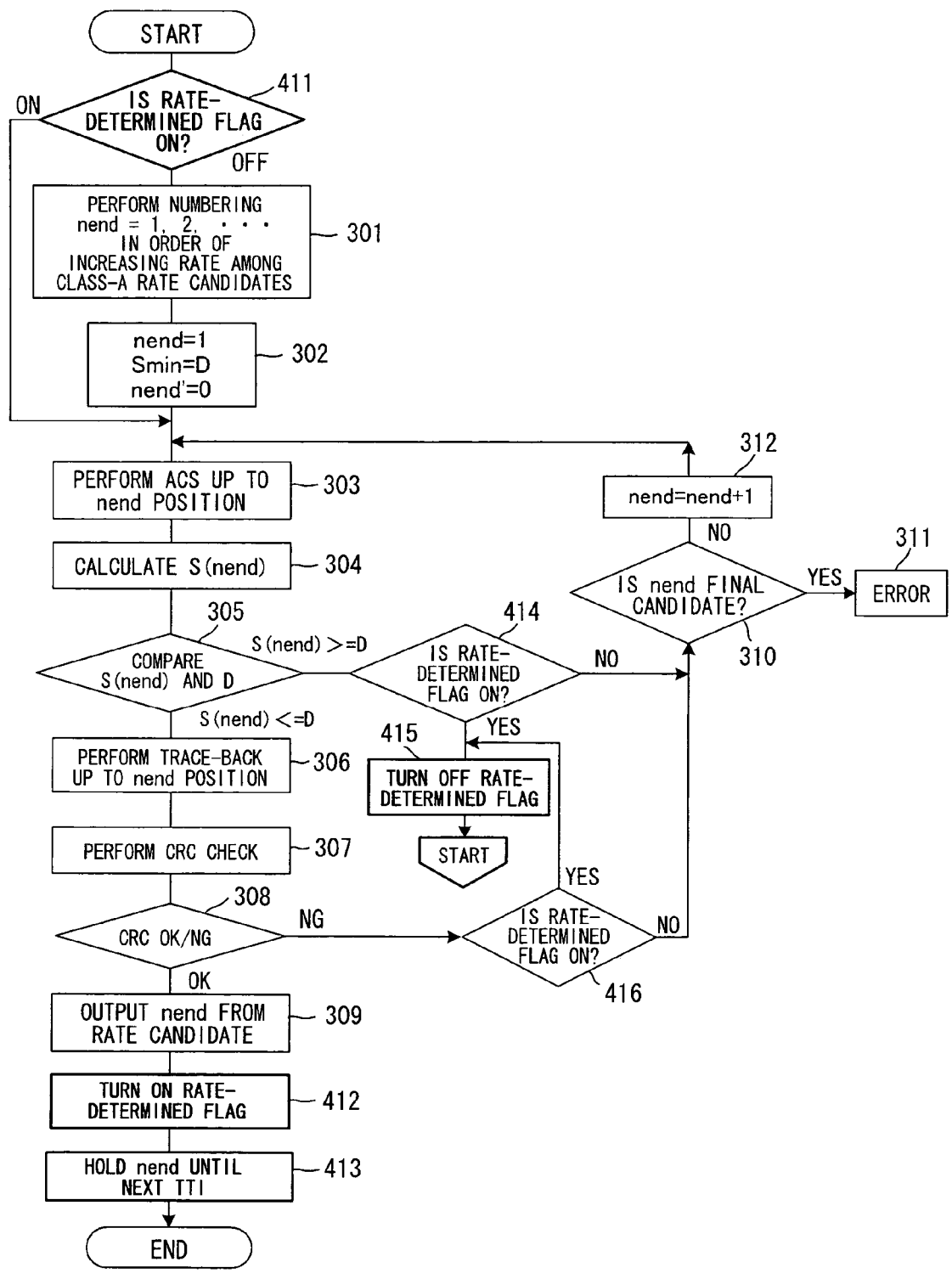
FIG. 7 is a flowchart of BTFD processing according to a second embodiment of the present invention.

FIG. 7 is a flowchart of BTFD processing according to a second embodiment of the present invention. Processing identical with that of the processing flowchart of the first embodiment is denoted by like step numbers.

According to the second embodiment, the bit-rate combination candidate prevailing when an acceptable CRC check is obtained and the bit rate of Class A has been definitely determined is held for the period of the transmission time interval TTI and succeeding BTFD processing following elapse of TTI is started from the bit rate of Class A in the bit-rate combination that has been stored.

Ordinarily, in the case of a voice call, it is usual for a voice activity segment (a rate of 12.2 kbps) and a silence segment to each continue in units of tens of seconds. The unit of the TTI in voice code is 20 ms. This means that the intervals of changes in the voice activity segment/silence segment in a voice call will be long in comparison with the TTI unit, and the probability that the rate will change between the present TTI and the next TTI will be low in comparison with the probability that there will be no change. Accordingly, the second embodiment utilizes the fact that if, once the bit rate has been definitely determined, BTFD processing is executed at the same bit rate even in the next TTI, then the probability that an acceptable CRC check will be obtained and that the bit rate will be definitely determined at this time rises.

The difference between this processing and that of the flowchart of the first embodiment is that a rate-determined flag, which is set when the bit rate of each class has been definitely determined, is introduced, and BTFD processing is executed using the rate-determined flag. In the description that follows, emphasis will be placed on the processing that differs from that of the first embodiment.

First, the rate-determined flag is turned off before reception of voice starts. Next, reception of voice starts and it is determined whether the rate-determined flag is on or off (step 401). Since the flag initially is off, BTFD processing is executed in order of increasing rate in a manner similar to that of the first embodiment (steps 301 to 309). If the bit rate of Class A is definitely determined at step S309, the rate-determined flag is turned on (step 412) and the bit rate (bit length in TTI units) of Class A at this time, namely $n_{end}$, is held until the next TTI (step 413). As a result, in the next TTI, the rate-determined flag will be off at step 411 and therefore the ACS operation is started from $n_{end}$ that was retained in the preceding TTI.

If $S(n_{end})>D$ is found to hold at step 305 and it is judged that the data is not reliable, then it is determined whether the rate-determined flag is on (step 414). If the rate-determined flag is on, then the rate-determined flag is turned off (step 415), control returns to step 411 and processing from this point onward is repeated. Further if the rate-determined flag is found to be off at step 411, the processing of step 310 is executed. That is, it is determined at step S310 whether the above-described processing has been applied with regard to $n_{end}$ of all candidates (step 310). If the above processing has been applied to $n_{end}$ of all candidates without an acceptable CRC check being obtained, a "YES" decision is rendered at step 310 and an error is output (step 311). However, if the above processing has not been completed with regard to $n_{end}$ of all candidates, then $n_{end}$ is incremented (step 312) and processing from step 411 onward is repeated.

Further, if it has been clarified at step 308 that the result of the CRC check is not OK, then it is determined whether the rate-determined flag is on (step 416). If the rate-determined flag is on, then this flag is turned off (step 415), control returns to step 411 and processing from this point onward is repeated. If the rate-determined flag is found to be off at step 416, then processing from step 310 onward is repeated.

Thus, in accordance with the second embodiment, it is so arranged that if the bit rate has been definitely determined, BTFD processing is executed at the same bit rate even in the next TTI. As a result, the bit rate of each class can be decided through a small among of BTFD processing.

(F) Third Embodiment of BTFD Processing According to the Present Invention

Figure 8:
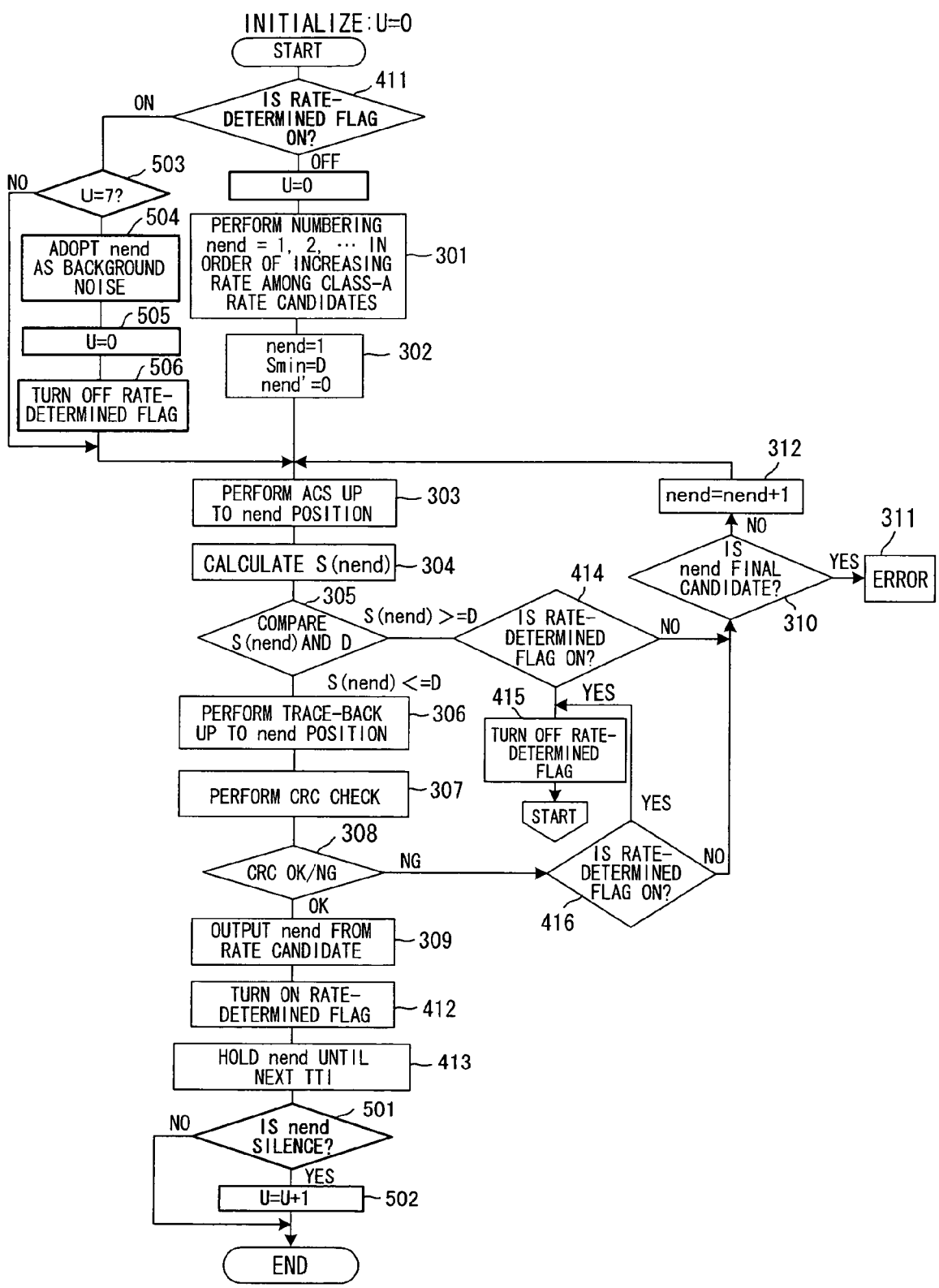
FIG. 8 is a flowchart of BTFD processing according to a third embodiment of the present invention.
Figure 9:
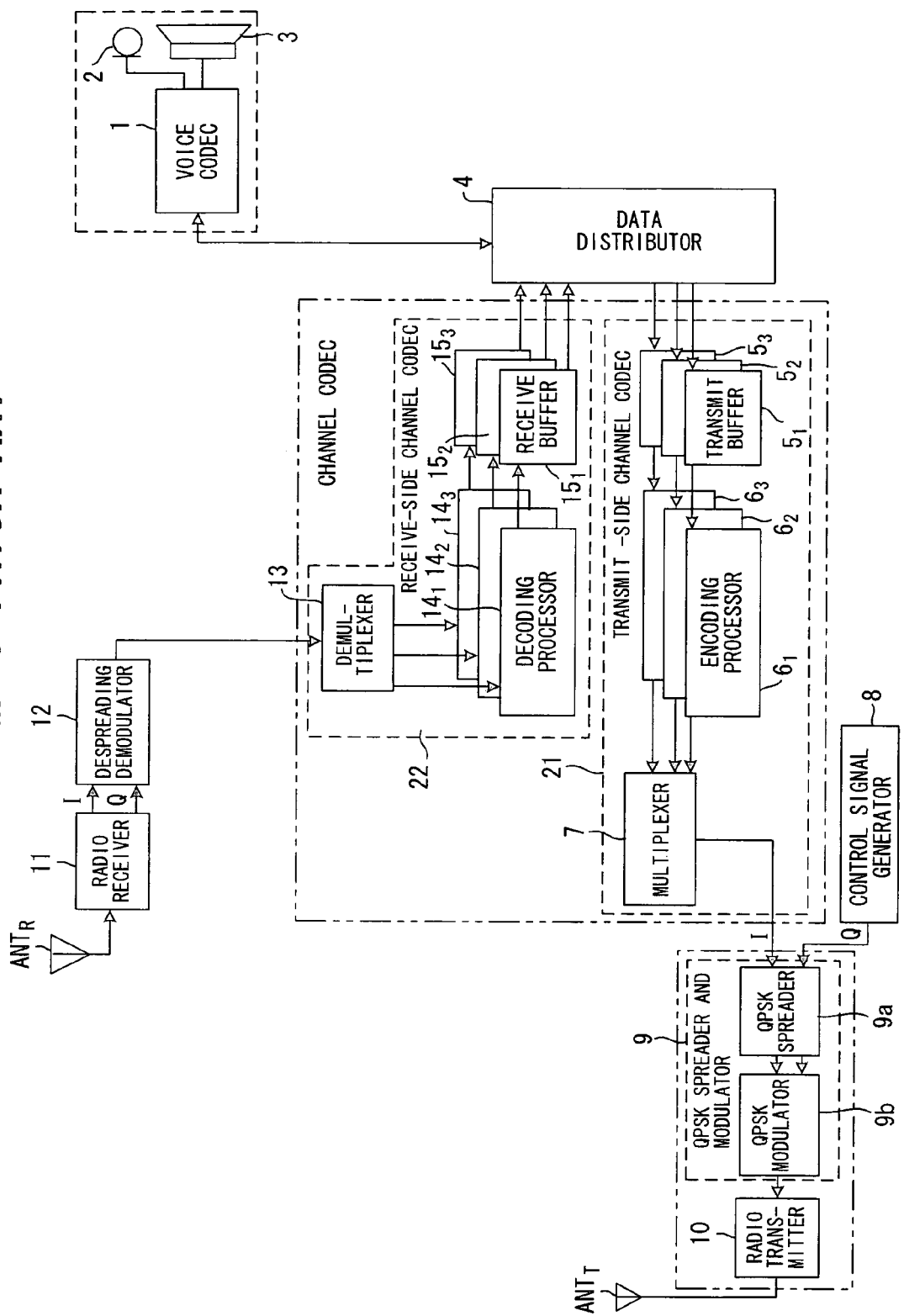
FIG. 9 is a block diagram of a mobile station according to the prior art.
Figure 11:
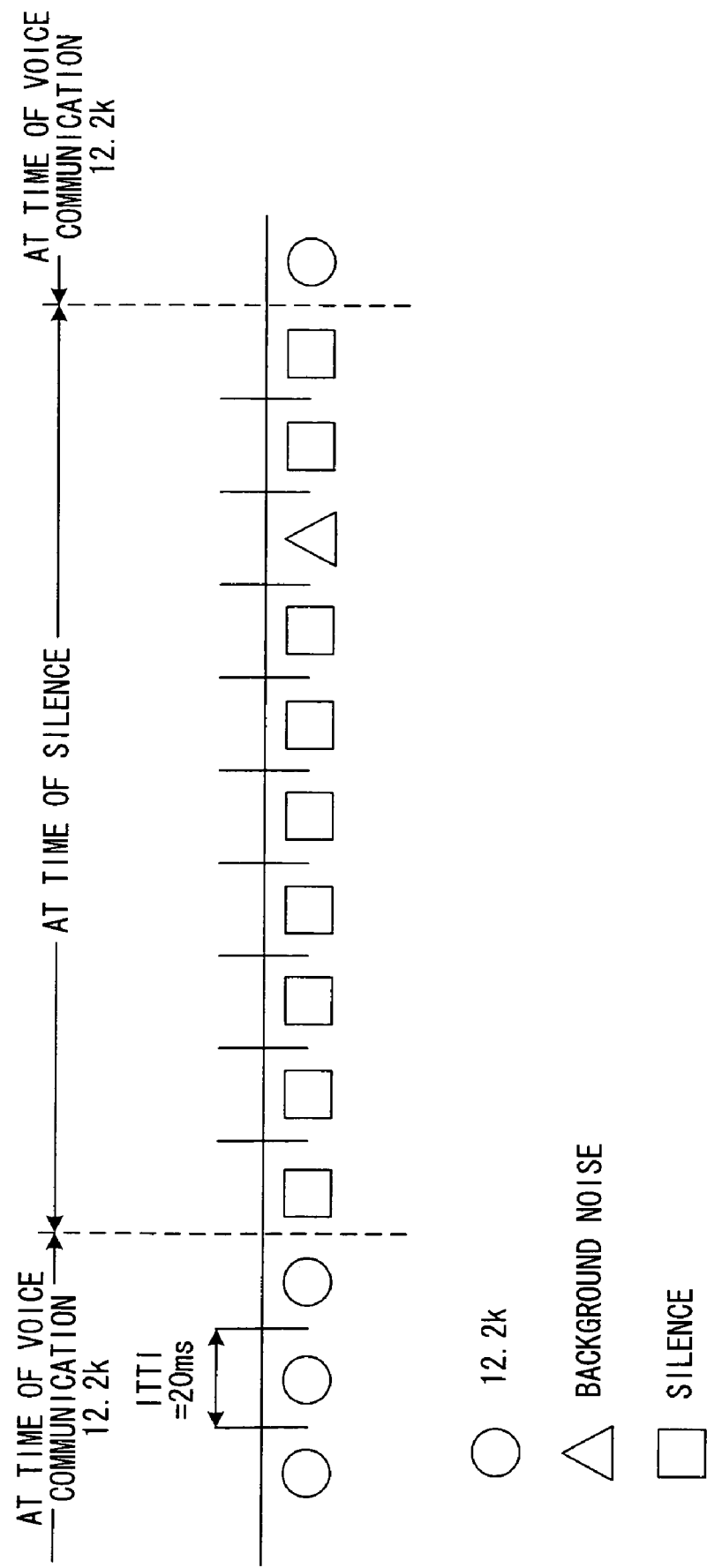
FIG. 11 is a diagram useful in describing insertion of a background-noise frame.

FIG. 8 is a flowchart of BTFD processing according to a third embodiment of the present invention. Processing identical with that of the processing flowcharts of the first and second embodiments is denoted by like step numbers. According to the third embodiment, silence states are counted and, if silence states are detected seven times in succession in the past, then, in the next TTI, BTFD processing is started from the bit rate of background noise. The reason for this is that in accordance with the specifications of a 3GPP voice codec, it is defined that one segment of background noise is inserted in a silence state of 8×TTI. If this arrangement is adopted, the amount of processing involved in BTFD processing can be reduced.

First, a silence-frame count U is initialized before reception of voice starts. If voice reception starts and the rate-determined flag is off (step 411), BTFD processing is executed in order of increasing rate in a manner similar to that of the first embodiment (steps 301 to 309). If the bit rate of Class A is definitely determined at step S309, the rate-determined flag is turned on (step 412) and the bit rate of Class A at this time, namely $n_{end}$, is held until the next TTI (step 413). Next, it is determined whether the definitely determined $n_{end}$ is the bit rate of silence (step 501). If the bit rate is not that of silence, the next TTI is awaited. On the other hand, if the bit rate is that of silence, the number U of silence states is counted up (U=U+1; step 502) and the system awaits the next TTI.

If the rate-determined flag is found to be on in the next TTI (step 411), it is determined whether number U of silence frames has reached seven (step 503). If U has not reached seven, then processing from step 303 onward is executed on the assumption that $n_{end}$ was definitely decided in the preceding TTI. If U has reached seven, then $n_{end}$ is adopted as background noise (step 504). At this time the silence-frame count U is initialized to zero (step 505), the rate-determined flag is turned off (step 506) and processing from step 303 onward is executed. In response to executing the step U=0 and turning off the rate-determined flag, BTFD processing is started from the next TTI in order of increasing rate, i.e., from the $n_{end}$ of silence.

Though the present invention has been described with regard to a case where the invention is applied to a mobile terminal, it is of course possible to apply the invention to a stationary terminal.

(G) Effects of the Invention

Thus, in accordance with the present invention, the amount of processing and current consumed in BTFD processing can be reduced. Moreover, even though these are reduced, the number of bits of voice code of each class can be identified and the voice code of each class can be separated correctly and input to a voice codec.

Further, in accordance with the present invention, the number of memories used in BTFD processing can be reduced. Moreover, even though the number of memories used is reduced, the number of bits of voice code in each class can be identified.

Further, in accordance with the present invention, even if the number of bits of voice code in each class changes every transmission time interval TTI, the leading address of the memory that stores the data of each class is fixed and control of the leading address can be facilitated.

What is claimed is:

1. A receiving apparatus in a communication system in which voice code is divided into a plurality of classes, the voice code in each class is expressed by a number of bits that conforms to a prescribed bit rate, a check code of a fixed length is attached to voice code of one class, the voice code of each class is subjected to error-correction encoding processing, and voice code that has undergone error-correction encoding processing in each class is transmitted upon being multiplexed in such a manner that the class with the attached check code is brought to the forefront, comprising:

a bit-rate candidate holding unit for holding a plurality of bit-rate combination candidates of each of the classes;

a decoding processing unit for applying error-correction decoding processing to receive data corresponding to the class with the attached check code on the assumption that the voice code of the class with the attached check code is expressed by a number of bits that conforms to the bit rate of the class with the attached check code in each of the bit-rate combination candidates;

an investigating unit for investigating whether result of decoding is correct using the check code; and a bit-count discriminating unit which, when it is judged by said investigation that the result of decoding is correct, is for discriminating that the numbers of bits conforming to the bit rates of each of the classes in the bit-rate combination candidate prevailing at this time are numbers of bits that express the voice codes of each of the classes.

2. A receiving apparatus according to claim 1, further comprising:

means for applying error-correction decoding processing to classes other than the class with the attached check code, based upon the discriminated numbers of bits of the voice codes of each of the classes; and a voice reconstruction unit for reconstructing a voice signal using the voice codes of each of the classes.

3. A receiving apparatus according to claim 1, further comprising a storage unit which, when it is judged by said investigation that the result of decoding is correct, is for storing the bit-rate combination candidate that prevails at this time;

wherein when the voice code of each of the classes is demultiplexed from receive data and input to a voice reconstruction unit every transmission time interval, said decoding processing unit applies error-correction decoding processing to the receive data on the assumption that the voice code of the class with the attached check code is expressed by a number of bits that conforms to the bit rate of the class with the attached check code in the bit-rate combination candidate that has been stored in said storage unit; and when it has been clarified by the investigation of the check code that the result of decoding is incorrect, said decoding processing unit applies error-correction decoding processing to the receive data on the assumption that the voice code of the class with the attached check code is expressed by a number of bits that conforms to the bit rate of the class with the attached check code in another bit-rate combination candidate until the result of decoding is correct.

4. A receiving apparatus according to claim 1, further comprising a silence state monitoring unit for monitoring whether a silence state has continued for a prescribed number of times;

wherein when the voice code of each of the classes is demultiplexed from receive data and input to a voice reconstruction unit every transmission time interval, said decoding processing unit applies error-correction decoding processing to the receive data on the assumption that the voice code of the class with the attached check code is expressed by a number of bits that conforms to the bit rate of the class with the attached check code in a predetermined bit-rate combination candidate if the silence state has continued for the prescribed number of times; and when it has been clarified by the investigation of the check code that the result of decoding is incorrect, said decoding processing unit applies error-correction decoding processing to the receive data on the assumption that the voice code of the class with the attached check code is expressed by a number of bits that conforms to the bit rate of the class with the attached check code in another bit-rate combination candidate until the result of decoding becomes correct.

5. A receiving apparatus, comprising:

a receiving unit for receiving a signal that has been modulated by variable-length data that includes error-detection data;

an error detecting unit for selecting a plurality of data-length candidates in order, extracting an amount equivalent to the selected data length with regard to a demodulated signal and performing error detection using the error-detection data;

and a data length determination unit for determining a candidate of a data length as a data length of the variable length in a case where an error could not be detected by said error detecting unit, wherein characterized in that:

said data length determination unit determines, as the data length of the variable length, a candidate of an initial data length for which an error could not be detected by said error detecting unit.

6. A receiving apparatus according to claim 5, wherein the variable-length data comprises data that includes any of voice-activity data, silence data and background-noise data having different data lengths, and error-detection data, the data being generated successively based upon call voice; and said error detecting unit adopts the candidate of the data length of variable data length determined by said data length determination unit as a candidate of data length initially selected with regard to following variable-length data received next.

7. A receiving apparatus according to claim 6, wherein said successive generation is generated on the order of milliseconds.

8. A receiving apparatus according to claim 6, wherein the variable-length data comprises data that includes any of voice-activity data, silence data and background-noise data having different data lengths, and error-detection data, the data being generated successively, in accordance with a prescribed rule, based upon call voice; and said error detecting unit decides the order of candidates of data lengths, which are selected with regard to following variable-length data, upon referring to the history of candidates of data lengths of variable length, which have been determined by said determination, and said prescribed rule.

9. A receiving method in a CDMA communication system in which voice code of a prescribed transmission time interval is divided into a plurality of classes, the voice code in each class is expressed by a number of bits that conforms to a prescribed bit rate, a check code of a fixed length is attached to voice code of one class, the voice code of each class is subjected to error-correction encoding processing, and voice code that has undergone error-correction encoding processing in each class is transmitted upon being multiplexed in such a manner that the class with the attached check code is brought to the forefront, comprising steps of:

holding a plurality of bit-rate combination candidates of each of the classes;

applying error-correction decoding processing to receive data corresponding to the class with the attached check code on the assumption that the voice code of the class with the attached check code is expressed by a number of bits that conforms to the bit rate of the class with the attached check code in each of the bit-rate combination candidates;

investigating whether result of decoding is correct using the check code and, when it is judged by said investigation that the result of decoding is correct, discriminating that the numbers of bits conforming to the bit rates of each of the classes in the bit-rate combination candidate prevailing at this time are a numbers of bits that express the voice codes of each of the classes, and ending processing for discriminating the number of bits;

applying error-correction decoding processing to classes other than the class with the attached check code, based upon the discriminated numbers of bits of the voice code of each of the classes; and reconstructing a voice signal using the voice code of each of the classes.

10. A receiving method according to claim 9, wherein when it has been clarified by the investigation of the check code that the result of decoding is incorrect, error-correction decoding processing is applied to the receive data on the assumption that the voice code of the class with the attached check code is expressed by a number of bits that conforms to the bit rate of the class with the attached check code in another bit-rate combination candidate until the result of decoding is correct.

11. A receiving method according to claim 10, further comprising steps of:

when it has been clarified by said investigation that the result of decoding is correct, storing the bit-rate combination candidate prevailing at this time; and when the voice code of each of the classes is demultiplexed from receive data and input to a voice reconstruction unit every transmission time interval, applying error-correction decoding processing to the receive data on the assumption that the voice code of the class with the attached check code is expressed by a number of bits that conforms to the bit rate of the class with the attached check code in the bit-rate combination candidate that has been stored.

12. A receiving method according to claim 10, further comprising steps of:

monitoring whether a silence state has continued for a prescribed number of times; and when, if the silence state has continued for the prescribed number of times, the voice codes of each of the classes are demultiplexed from receive data and input to a voice reconstruction unit every transmission time interval, applying error-correction decoding processing to the receive data on the assumption that the voice code of the class with the attached check code is expressed by a number of bits that conforms to the bit rate of the class with the attached check code in a bit-rate combination candidate that conforms to background noise.

* * * * *